United States Patent
Shaw

[15] 3,652,935
[45] Mar. 28, 1972

[54] ELECTRICAL CURRENT MEASUREMENT AND RAPIDLY LOCATING AND POSITIVELY IDENTIFYING CATHODES HAVING ABNORMAL ELECTRICAL CONDITIONS ASSOCIATED THEREWITH IN AN ELECTROLYTIC COPPER REFINING PROCESS TANKHOUSE

[72] Inventor: Frank D. Shaw, Rumson, N.J.
[73] Assignee: American Smelting and Refining Company, New York, N.Y.
[22] Filed: Jan. 7, 1970
[21] Appl. No.: 1,108

[52] U.S. Cl. .......................... 324/127, 324/117 R, 324/149
[51] Int. Cl. ........................................ G01r 1/22, G01r 33/00
[58] Field of Search .................. 324/127, 117 R, 117 H, 149

[56] References Cited

FOREIGN PATENTS OR APPLICATIONS 991,779 10/1951 France .................................. 324/127

Primary Examiner—Rudolph V. Rolinec
Assistant Examiner—Ernest F. Karlsen
Attorney—Elwood J. Schaffer and Roger J. Drew

[57] ABSTRACT

Cathodes having abnormal electrical conditions associated therewith in an electrolytic copper refinery tankhouse are rapidly and positively identified to enable the early remedying of the abnormal condition or conditions, for instance short circuited cathodes or poor contacts, by closing the normally open, cathode bar receptive, pivotally mounted, automatically closeable and automatically openable jaws of a sensing head of an electrical current measuring instrument, or of the sensing heads of a plurality of current measuring instrument units depending from a common supporting means of a current measuring apparatus, about one or more of a plurality of spaced apart cathode bars in the tankhouse and from which the cathodes are suspended and immersed in the electrolyte. The sensing head jaws are closed about the cathode bars by lowering the instrument or apparatus whereby shoes of the instrument's operating mechanism are forcefully applied against the cathode bar or bars due to the weight of instrument or apparatus parts, thereby automatically closing the jaws of the sensing head or heads to substantially encompass the cathode bar or bars. The current passing through each cathode bar is measured by utilizing the magnetic field created by the current passing through the cathode bar to induce a measurable e.m.f. and a measurable electrical current in conductive coils on nonmagnetic cores of the sensing head jaws in a preferred embodiment. The current measurement value for the cathode bar or each of the cathode bars is compared with a predetermined desired current measurement value for its suspended cathode thereby positively identifying any cathode or cathodes having an abnormal electrical condition or conditions associated therewith.

35 Claims, 20 Drawing Figures

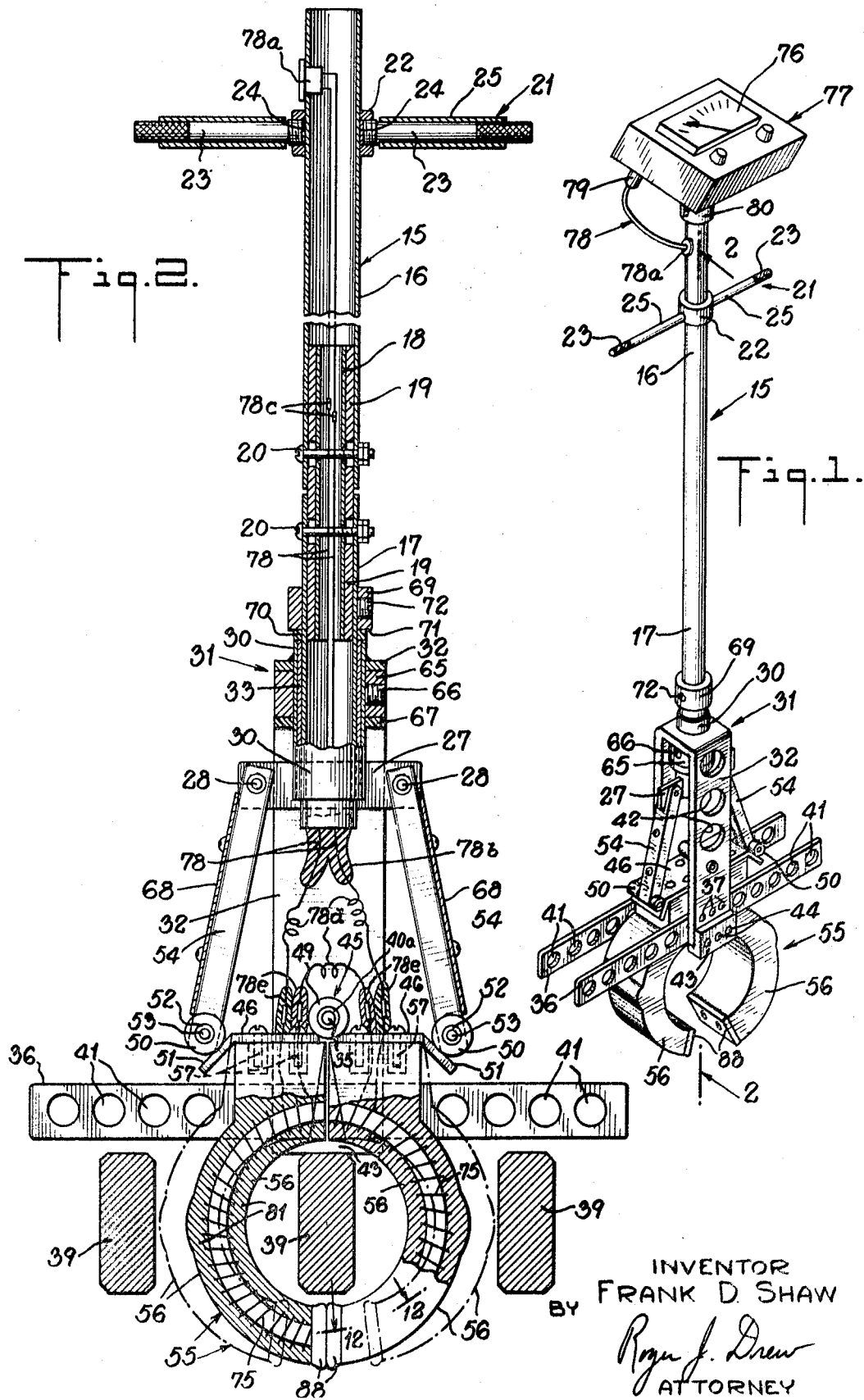

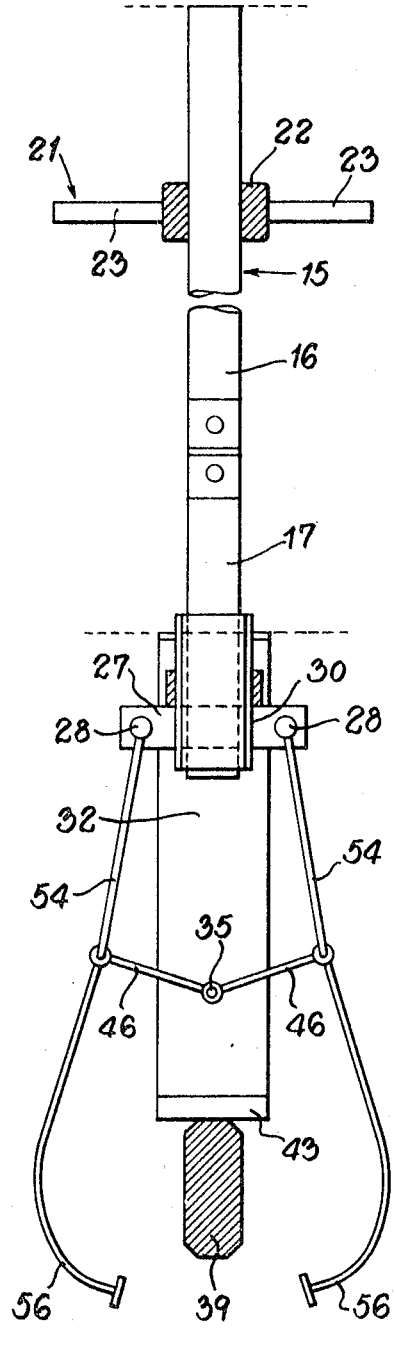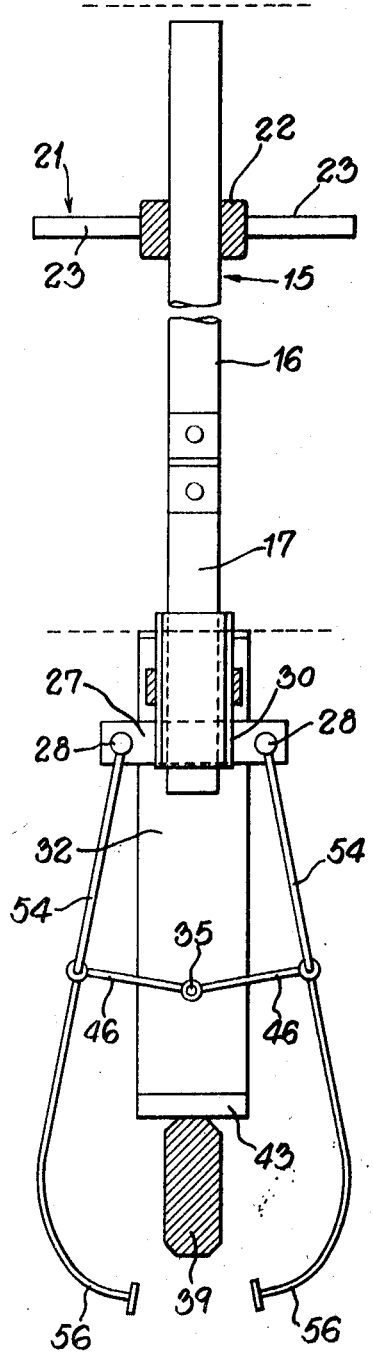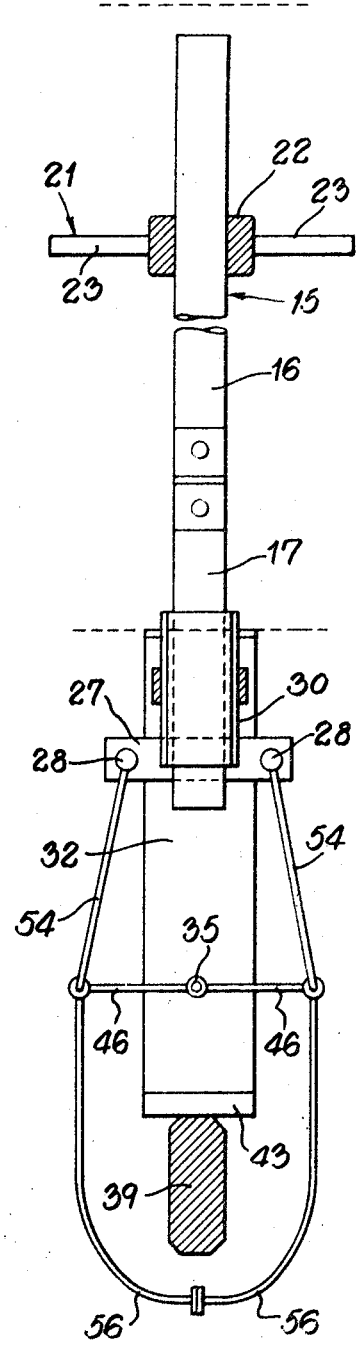

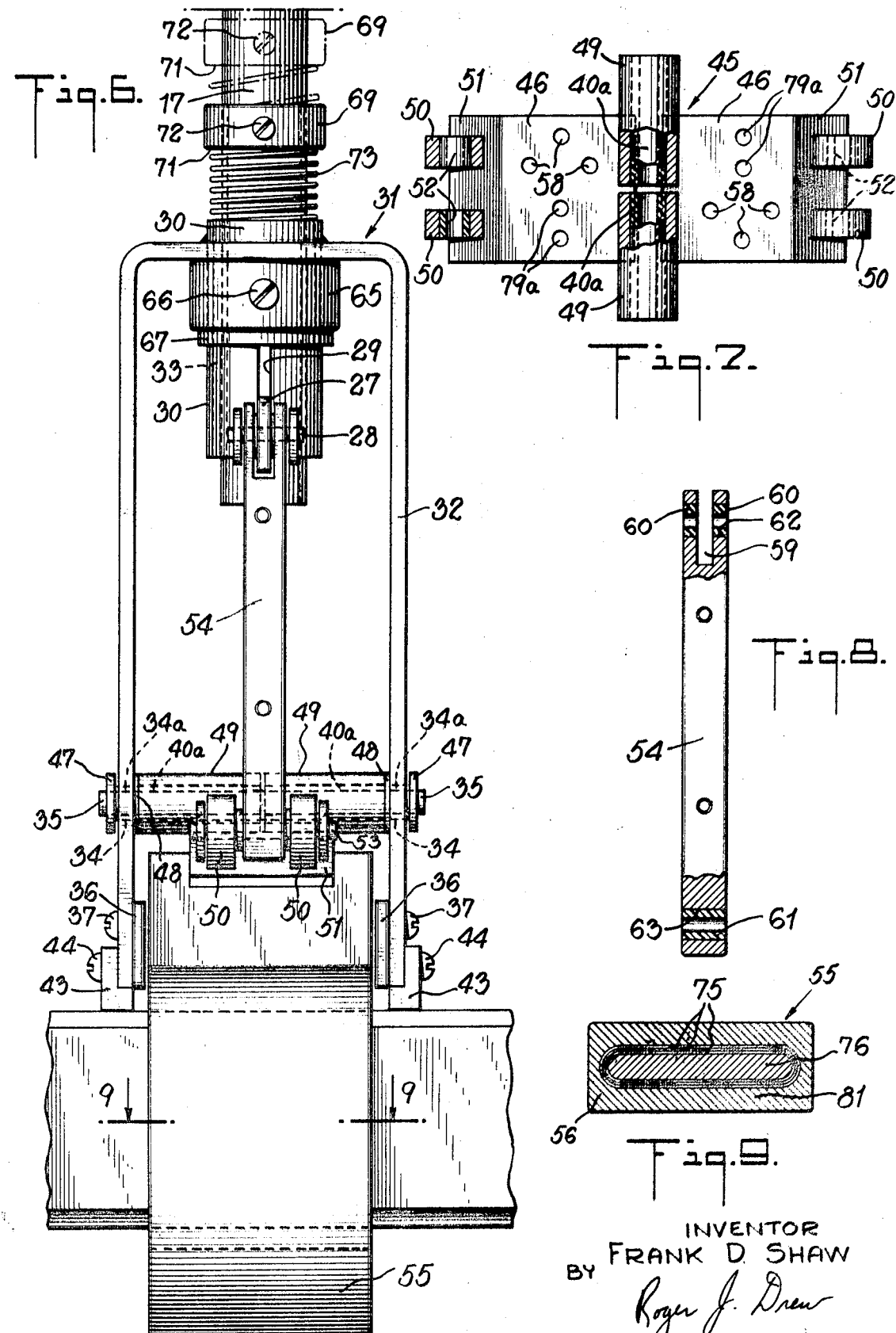

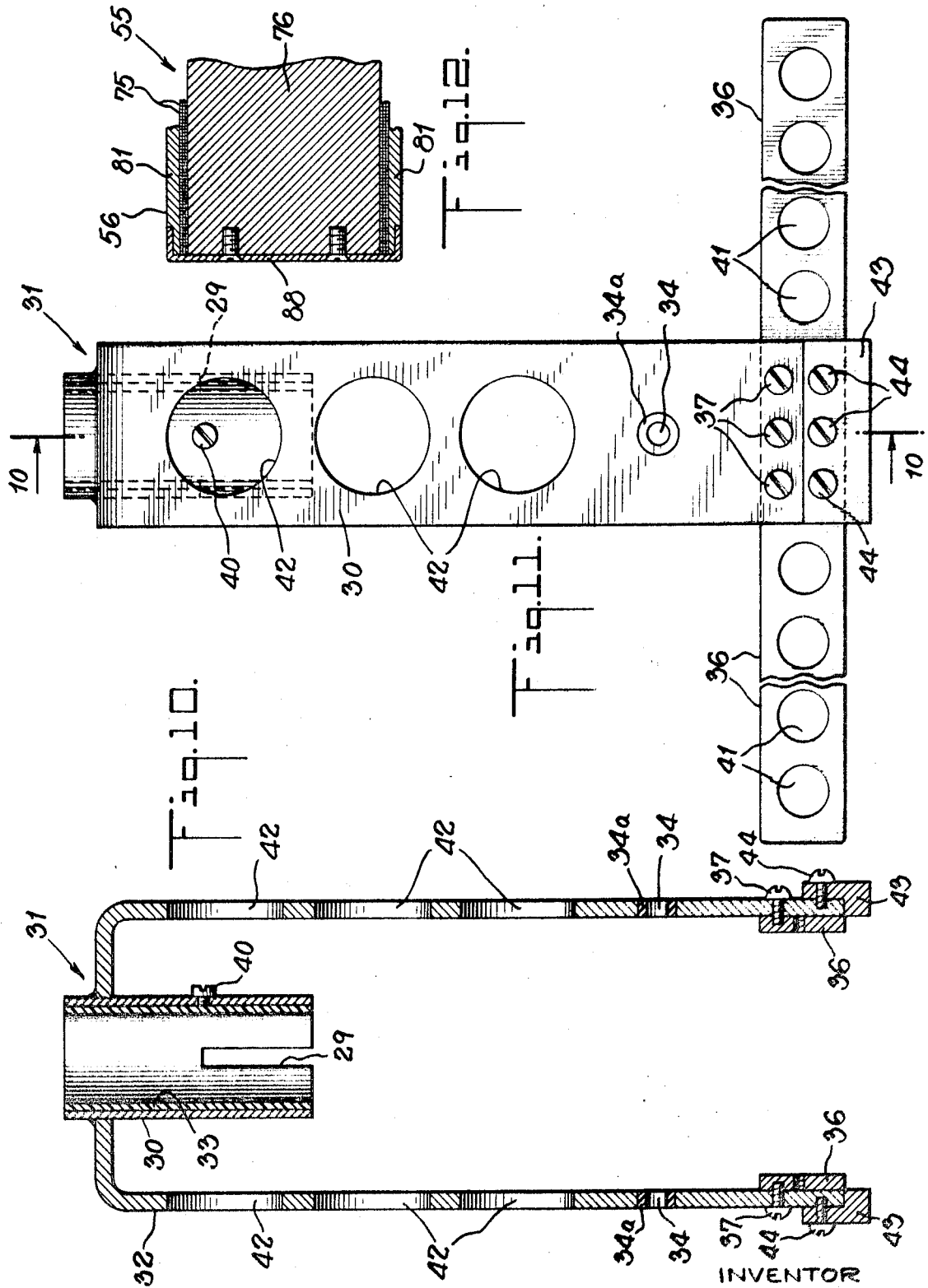

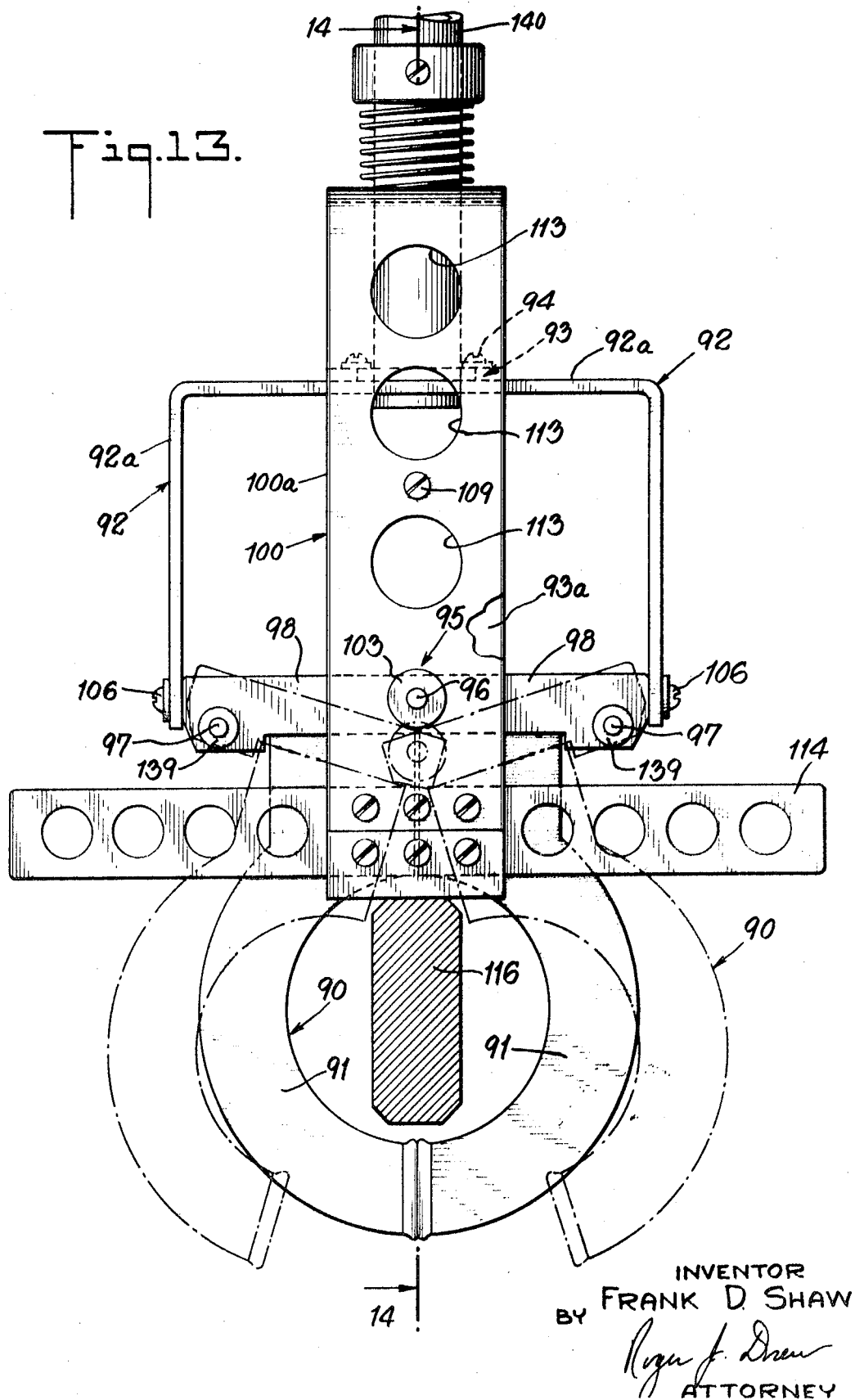

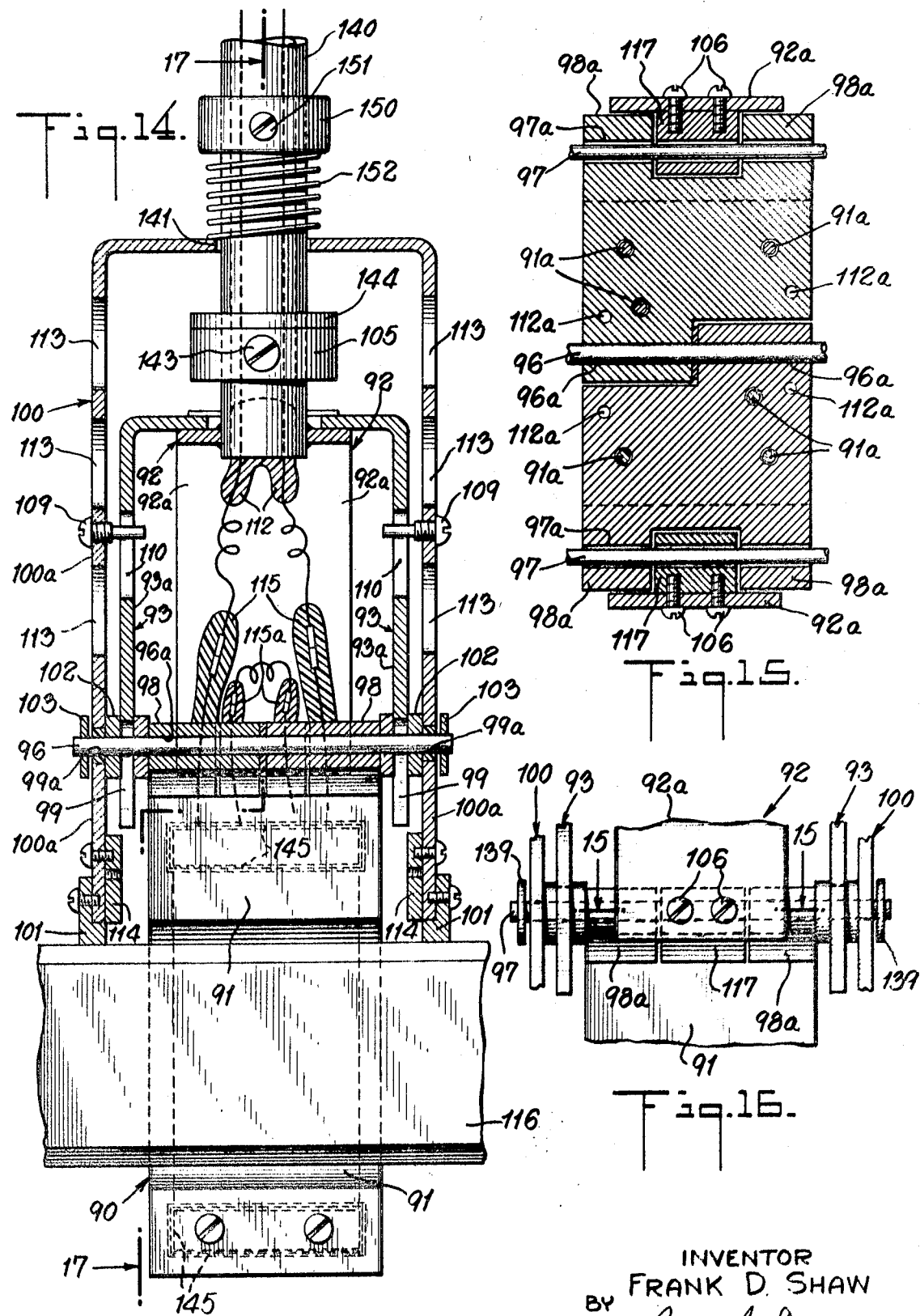

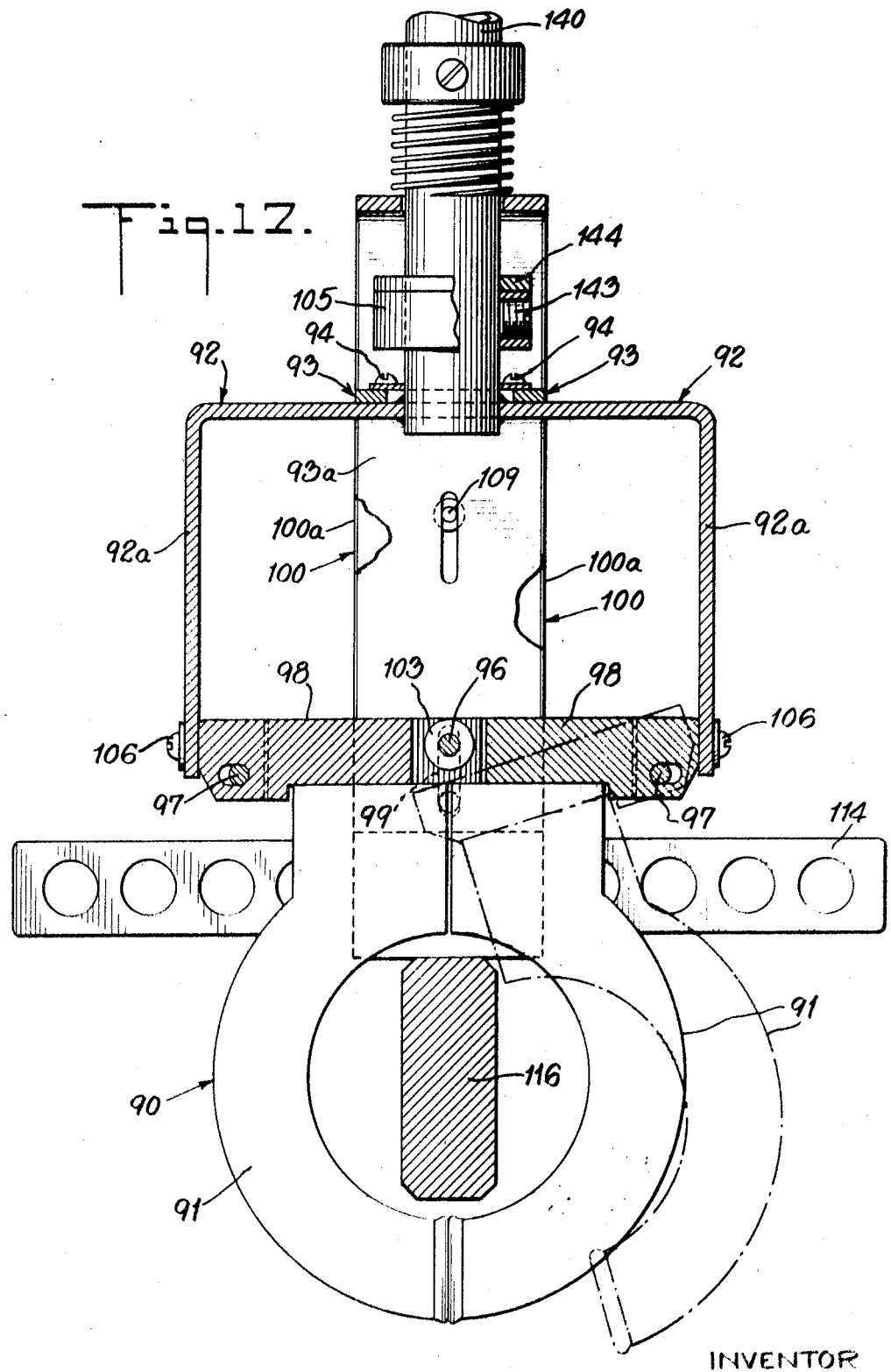

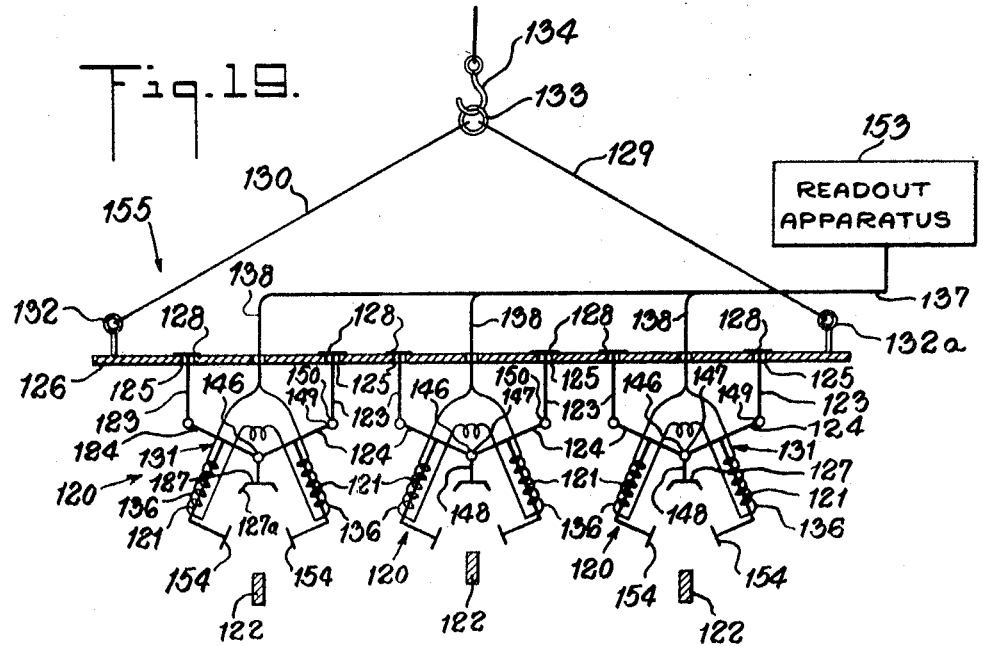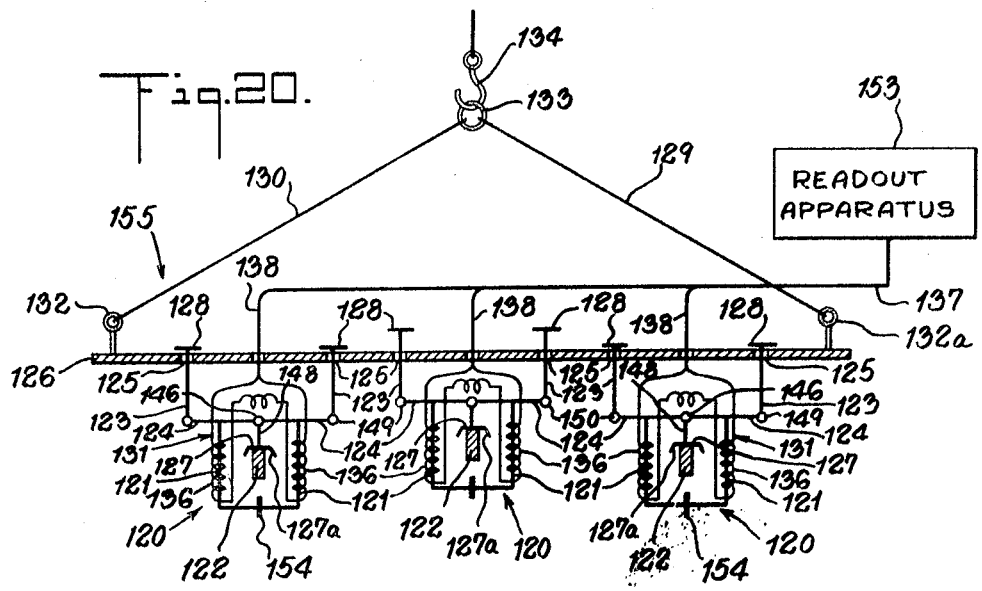

ELECTRICAL CURRENT MEASUREMENT AND RAPIDLY LOCATING AND POSITIVELY IDENTIFYING CATHODES HAVING ABNORMAL ELECTRICAL CONDITIONS ASSOCIATED THEREWITH IN AN ELECTROLYTIC COPPER REFINING PROCESS TANKHOUSE

BACKGROUND OF THE INVENTION

1. Field of the Invention

This invention relates to the measurement of electrical current, and more particularly to new and improved instruments and apparatus for measuring electrical current passing through one or more conductors. Additionally this invention is directed to a method for the rapid location and positive identification of cathodes having an abnormal electrical condition or conditions associated therewith in an electrolytic copper refinery tankhouse, thereby enabling the remedying of the abnormal electrical condition or conditions.

2. DESCRIPTION OF THE PRIOR ART

In the electrolytic copper refining process, it is well understood by those of ordinary skill in the art that a desideratum in current distribution in a tank or cell is to have no anode to cathode short circuits, all cathodes carrying equal currents, and no non-current-carrying cathodes or anodes. For example, in a 10,000 ampere circuit wherein each tank has 30 cathodes, the desired current measurement value for each cathode would be about 333 amperes, obtained by dividing 10,000 by 30.

"Clamp-on" ammeters for measuring DC current and having normally closed tongs or jaws are known in the prior art. Such ammeters require the meter man to use two hands to open the jaws for clamping about the conductor for the current measurement, with one hand gripping the handle and the other gripping and operating a lever or second handle which opens the jaws. Although these ammeters are understood to be useful to the aluminum, chlorine and magnesium cell line users, due to its 7,500 ampere range they are of no value or utility for measuring DC current through the cathode bars in an electrolytic copper refinery tankhouse. Further, even assuming for the moment these "clamp-on" ammeters had utility for cathode bar current measurement in a copper refinery tankhouse, the ammeter would be relatively slow and quite awkward for regular current efficiency work in the copper tankhouse due to requiring two hands for holding and opening the normally closed jaws.

Another "clamp-on" ammeter or current measuring instrument known in the measuring instrument prior art has a normally closed sensing head affixed to a handle, with the sensing head having normally closed tongs or jaws requiring a manual push-pull action on the handle by the meter man for opening for clamping about or encompassing the conductor. A portable ammeter-containing package or unit connected to the jaws by lead wires extending through the hollow handle shows the current measurement on a scale thereof by means of a pointer. The meter package has a handle whereby it can be carried by hand or slung over the shoulder of the meter man by a strap connected thereto. Such a "clamp-on" ammeter was tested on cathode bars in the copper refinery tankhouse. Although such ammeter gives satisfactory results in certain respects in the current measuring, it leaves room for improvement in the measurement of current flow through the cathode bars in the electrolytic copper refinery tankhouse. In general this last-mentioned "clamp-on" ammeter would also be relatively slow for regular current efficiency work in the tankhouse, which is due to the manual push-pull action required on the handle by the meter man to open the normally closed tongs or jaws of the sensing head and then to close the jaws around the cathode bar, after which the jaws have to again be manually opened by the action on the handle to remove them from around the bar. It would be desirable in the measurement of the cathode current in the copper refinery tankhouse to be able to employ a current measuring instrument capable of being clamped around each cathode bar and removed therefrom faster than such prior art instrument having the normally closed sensing head jaws, inasmuch as a faster operating instrument from the standpoint of encompassing and removal from each cathode bar could lead to increased electrical current efficiencies with higher copper cathode production and lower costs. The aforementioned prior "tong" or "clamp-on" type instrument also may pose a problem of inconvenience and awkwardness due to requiring both hands of the meter man for holding the instrument and exerting the push-pull action on the handle to open and close the tongs or jaws. Consequently the meter man has no free hand to hold the ammeter-containing package or unit, or to move the ammeter-containing unit when slung over his shoulder to a position enabling him to take the reading from the meter panel. Further he does not have a free hand with which to mark cathodes having abnormal current values or to make written record of these values if such is desired. Further the jaws of such prior "clamp-on" type instrument were too large to fit easily between the cathode bars in the copper refinery tankhouse and it was only by appreciable effort and maneuvering of the jaws that the jaws were able to clear and pass between the cathode bars to enable diagonal clamping about the cathode bar the current through which it was desired to measure. This excessive size of the jaws rendered the instrument unsuitable for regular current efficiency work in the tankhouse.

Gauss meters, which indicate the number of lines of magnetic force adjacent to a direct current carrying conductor, are used in the electrolytic copper refinery tankhouse, to indicate abnormal current conditions in a cathode bar and hence associated with the corresponding cathode. The gauss meter is located on the end of a vertical handle and moved over the tops of the cathode bars by the meter man. The reading of the gauss meter is affected by distance from the cathode bar, orientation with respect to the cathode bar and by magnetic fields due to other cathode bars and nearby supply bus bars, and hence a great amount of skill is required of the meter man. Use of the gauss meter in general does not provide a positive identification of cathodes having an abnormal electrical condition or conditions associated therewith.

Millivoltmeters have also been utilized heretofore in an electrolytic copper refinery tankhouse for current efficiency work or "trouble shooting." The millivoltmeter measures the voltage drop between each anode and cathode. The sensing end of the millivoltmeter is usually inserted in the electrolyte on one side only of the cathode and between it and the anode. After the millivoltmeter reading is read by the meter man, the meter is "jumped over" the electrolyte on the other side of that cathode and between it and the next anode and its sensing end re-immersed in the electrolyte on the other side of the anode last mentioned and the next cathode. This pattern of immersion of the millivoltmeter sensing end is usually followed substantially the length of the tank. Based on the meter man's judgement of the millivoltmeter reading, he marks with chalk anodes or cathodes in association with which he believes an abnormal electrical condition or conditions exist, for example short circuits or poor electrical contacts, and which require correction. Corrections or adjustments are then made in an effort to eliminate the abnormal electrical condition or conditions. Later the meter man checks by millivoltmeter to determine whether the adjustments or corrections have been made and if they have, he removes his mark. The trouble is the normal voltage drop between the anodes and cathodes depends on extraneous factors as exemplified by current density, contact resistances, electrolyte composition, temperature of the electrolyte, amount of addition agent or agents present in the electrolyte, anode spacing (which is continually changing as anodes corrode and after first cycle cathodes are pulled), etc. Consequently one must depend on the meter man's judgement and ability to determine what voltage is relatively high and what voltage is relatively low for a given anode-cathode combination at that particular time, when compared to the tank and section as a whole. The millivoltmeters, generally speaking, do not provide a positive identification of cathodes having an abnormal electrical condition or conditions associated therewith due to the extraneous factors mentioned.

It is important to locate and remedy as soon as possible any abnormal electrical condition or conditions of consequence, for instance short circuits, abnormally high or low cathode currents, poor contacts, etc. occurring in the tankhouse of the electrolytic copper refining process. The reason for this is that the deposition of copper at the cathode in the electrolytic refining process is in accordance with Faraday's law of electrolysis, and hence the amount of copper deposited at the cathode is proportional to the product of the electrical current flowing in amperes and the time the current flows.

Other "tong" type meters having normally closed tongs or jaws have been employed heretofor in electrolytic copper refinery tankhouses for current efficiency work. However these meters are badly adversely affected by the large magnetic fields in the tankhouse, and also leave room for improvement from the standpoint of speeding up the current measurement and efficiency work by reason of being quite slow, relatively speaking, to use and operate in that the normally closed sensing jaws must first be manually opened to encompass the conductor bar for the current measurement. Further the reliability of these meters depends a great deal on the judgement of the meter man, and these meters do not provide a positive identification of cathodes having an abnormal electrical condition or conditions associated therewith.

As far as I am aware, the prior copper electrorefining art was unable to come up with a method involving measurement of the direct current through the cathode bars which would positively identify cathodes in the electrorefinery tankhouse having an abnormal electrical condition or conditions associated therewith, and also enable such current measurement and cathode identification to be carried out as rapidly as is provided by my present invention.

OBJECT OF THE INVENTION

One object of this invention is to provide an instrument for rapidly and accurately measuring electrical current passing through a plurality of spaced apart conductors or a single conductor.

Another object of this invention is to provide an instrument for rapidly and accurately measuring direct electrical current passing through a plurality of conductors or a single conductor, whose successful use requires only minimal operator experience, judgement, skill and effort.

Another object is to provide an instrument for rapidly and accurately measuring direct electrical current passing through the cathodes in the tankhouse of an electrolytic copper refinery.

A further object is to provide an instrument for rapidly and accurate measuring electrical current passing through one or more conductors which requires only one hand of the meter man to operate, has automatically closeable sensing head jaws which are normally open and close about the conductor merely by a one handed lowering of the instrument to forcefully apply its shoes against the conductor, and has automatically openable sensing head jaws which open to a conductor receptive position for the next current measurement merely by a one handed raising of the instrument to withdraw forceful application of its shoes from the conductor.

Still another object is to provide a method for rapidly locating and positively identifying cathodes having an abnormal electrical condition or conditions associated therewith in one or more tanks of an electrolytic copper refinery tankhouse.

Another object is to provide for the more efficient and economical operation of the tankhouse of an electrolytic copper refinery.

A further object is to attain an appreciably increased production of refined copper in an electrolytic copper refinery tankhouse.

An additional object is to provide an apparatus for rapidly and accurately measuring the electrical current passing through a plurality of spaced apart conductors.

Still another object is to provide an apparatus for rapidly and accurately measuring the electrical current passing through a plurality of spaced apart cathode bars in an electrolytic copper refinery tankhouse.

A further object is to provide a method for rapidly locating and positively identifying cathodes having an abnormal electrical condition or conditions associated therewith in an electrolytic copper refinery tankhouse without being adversely affected by a neighboring magnetic field or fields due to electric current passing through another conductor or conductors in the tankhouse.

Additional objects and advantages will be apparent as the invention is hereinafter described.

SUMMARY OF THE INVENTION

In accordance with the present invention, I have found that cathodes having an abnormal electrical condition or conditions associated therewith, for instance short circuited cathodes and poor electrical contacts, in an electrolytic copper refinery tankhouse can be relatively rapidly located and positively identified and in this and other respects hereinafter set forth, my invention constitutes a considerable improvement over the prior art which is previously described herein. By virtue of providing for the more rapid location and positive identification of the cathode or cathodes having the abnormal electrical condition or conditions associated therewith, the present invention enables the more rapid remedying or correcting of the abnormal condition or conditions. The method of the present invention, in its broader aspects, comprises, in combination, the steps of rapidly and accurately sensing and measuring the direct electrical current passing through one or more or all of a plurality of spaced apart cathode bars each having a cathode suspended therefrom and immersed in electrolyte in one or more tanks in the electrolytic copper refinery tankhouse by utilizing a magnetic field created by the current through the cathode bar or bars, and comparing the current measurement value for each cathode bar with a predetermined desired current measurement value for its suspended cathode thereby positively identifying a cathode or cathodes having an abnormal electrical condition or conditions associated therewith. The direct current passing through any remaining cathode bars in the one or more tanks which was not sensed and measured by the sensing and measuring step previously disclosed herein is rapidly and accurately sensed whereby all cathode bars are current sensed and measured, and the current measurement value for each of any such cathode bars is compared with a predetermined desired current measurement value for the corresponding suspended cathode thereby positively identifying a cathode or cathodes having an abnormal electrical condition associated therewith. The cathode or cathodes found to have the abnormal electrical condition or conditions associated therewith are then noted in any suitable manner, for example by marking the cathodes or cathodes with chalk; by the output device of a computer printing out the information on paper, recording or writing the information from the computer on magnetic tape, cards or paper tape, or producing graphic displays, the input device of the computer having been supplied with the data; or by recording on a chart or other suitable recording medium to obtain a profile the current measurement values for all of the cathode bars in a tank or cell or section of tank or in the entire tankhouse of the electrolytic copper refinery. This profile of the current measurement values disclosed immediately above is compared with a profile of the predetermined desired current measurement values for the cathode bars thereby identifying the cathode or cathodes having the abnormal electrical condition or conditions associated therewith. An output device of a computer which transmits signals over a teleprocessing network or networks can also be employed.

Further the cathode or cathodes having the abnormal electrical condition or conditions associated therewith can be noted by the employment of a transducer which translates pivot shaft rotation into a signal for remote readout, or by electronic scanning, with the results indicated recorded, printed or displayed in any suitable way.

After the cathode or cathodes having the abnormal electrical condition or conditions have been located and identified as such, which is a positive identification of such cathodes as aforementioned, the abnormal electrical condition or conditions are usually remedied or corrected.

The sensing and measuring of the direct current passing through the cathode bars in the copper refinery tankhouse in the method of this invention is preferably effected by closing the normally open, conductor receptive sensing head jaws each including one or more electrically conductive coils on a nonmagnetic core of a current measuring instrument, or of a plurality of current measuring instrument units of a current measuring apparatus, about each cathode bar, or simultaneously about all cathode bars or a plurality of such bars but less than all bars, to substantially encompass each cathode bar. In this preferred current sensing and measuring, the coils of the jaws of the instrument or of each instrument unit are electrically connected to an ammeter-containing unit or package by connecting wires. By reason of the coils of the jaws cutting the magnetic lines of force about the cathode bar or bars, the magnetic force lines being due to the current passing through the bars, a measurable electromotive force and hence a measurable electrical current is induced in the coils the strength of which current is measured in amperes by the ammeter of the ammeter-containing unit or package. By so carrying out the sensing and measuring of the current, the sensing and measuring is not adversely affected by a neighboring magnetic field or fields resulting from electrical current passing through other conductors or buses.

In all embodiments of the method of this invention, the normally open, cathode bar-receptive sensing head jaws of the instrument or instrument units are closed or clamped, for the current measuring, about any suitable portion of the cathode bar or bars in the copper refinery tankhouse enabling or permitting the jaws to be closed or clamped thereabout. Thus when a copper loop is used to suspend the copper starting sheet or cathode from the cathode bar, the sensing head jaw or jaws can be closed or clamped about any portion of the cathode bar or bars on either side of the loop and between the loop edges and the sill or edge of the tank. Should another type of copper or metal suspending means or device be employed for suspending the starting sheet or cathode from the cathode bar and which other suspending means and device provides clearance for the sensing head jaws to be closed or clamped about another portion of the cathode bar or bars than that disclosed supra, the closing or clamping of the jaws about such other portion is entirely satisfactory.

In one embodiment of the method of the invention, the rapid and accurate sensing and measuring the current is carried out with respect but one of the plurality of spaced apart cathode bars each having the cathode suspended therefrom and immersed in the electrolyte in the copper refinery tankhouse, and the current measurement value for the cathode bar is compared with a predetermined desired current measurement value, usually an optimum current measurement value, for its suspended cathode thereby positively identifying the cathode as having an abnormal electrical condition or conditions associated therewith when such abnormal condition or conditions exists. The steps of sensing and measuring and then comparing the current measurement value of the cathode bar with the predetermined desired measurement value are then repeated in that sequence on all remaining cathode bars in the tank one at a time. The remainder of the method of this embodiment substantially is as previously disclosed herein for the method in its broader aspects.

In another embodiment of the method herein, the rapid and accurate sensing and measuring of the current is carried out simultaneously with respect a plurality of the spaced apart cathode bars and which may be all or less than all but still a plurality of the cathode bars in a tank, section, or even the tankhouse, and the current measurement value for each cathode bar is compared with a predetermined desired current measurement value, usually an optimum current measurement value, for its suspended cathode thereby positively identifying the cathode as having an abnormal electrical condition or conditions associated therewith when such abnormal condition or conditions exists. In the event less than all of the cathode bars in the tank, section, or tankhouse, as desired, had the current passing therethrough sensed and measured, the rapid and accurate sensing and measuring is conducted with respect the remaining cathode bar or bars and the current measurement value for each such bar or bars compared with a predetermined desired current measurement value, usually the optimum current measurement value, for its suspended cathode thereby making the positive identification referred to immediately above. The remainder of the method of this embodiment is substantially the same as previously disclosed herein for the method in its broader aspects.

In certain embodiments of the apparatus of this invention, the current measuring instrument has normally open, conductor receptive, pivotally mounted, automatically closeable and automatically openable sensing head tongs or jaws. The current measuring instrument is a portable instrument and is easily lowered by the meter man with only one hand (leaving the other hand free) to apply the instrument's shoes to the cathode bar or another solid surface in the tankhouse and to position the tongs or jaws about the cathode bar. Due solely to the weight of instrument parts including the sensing head jaws and a yoke assembly, the jaws close about the cathode bar with the lowering of the instrument to substantially encompass the bar for the current measuring. Upon raising or lifting of the instrument by the meter man, again easily done with but one hand, from the cathode bar with attendant withdrawal of forceful application of and ultimately of contact of the shoes from the cathode bar or other solid surface, the jaws open to their conductor receptive position ready for the next measurement again due solely to the weight of instrument parts including the sensing head jaws and a yoke assembly. The meter man merely walks rapidly, compared with the prior art metering, down the length of the tank or cell usually on the cathode bars to repeat this procedure of lowering the instrument to automatically close the jaws about each cathode bar and, after taking the current measurement reading on the ammeter-containing unit or package, raising or lifting the instrument to automatically open the jaws to receive the next cathode bar.

In another embodiment of the apparatus herein, a plurality of current measuring instrument units depends or is supported from a common supporting means. The measuring instrument units each have normally open, conductor receptive, pivotally mounted, automatically closeable and automatically openable sensing head jaws, and the instrument units are lowered and raised to and from the cathode bars in the tankhouse by a crane, or any other suitable raising and lowering device, for instance a suitable raising and lowering device or means mounted on an integral carriage or bridge on wheels spanning and straddling the entire tank or cell. The jaws of the instrument units close about the cathodes for the current measuring upon lowering the apparatus, to bring the instrument unit shoes in forceful contact with the cathode bars or other solid surfaces, and open upon raising or lifting of the apparatus to withdraw the forceful application of and ultimately the shoes from the cathode bars or other solid surfaces, solely by reason of the weight of apparatus parts including the sensing head jaws.

Alternatively, the jaws of the electrical current measuring instrument or instrument units of the current measuring apparatus may be maintained in the normally open, conductor receptive, ready position for positioning about the cathode bar or bars by the biasing or urging action of a helical spring or springs, or by the combination of the weight of instrument parts including the jaws and the urging action of the spring or springs, instead of by only the weight or mass of instrument parts.

The current passing through each cathode bar in the tankhouse of the electrolytic copper refinery is measured either directly or indirectly in accordance with the present invention. The sensing head or heads of the current measuring instrument or instrument units herein utilizes either directly or indirectly the magnetic field created by the current passing through the conductor or conductors to obtain the value of the current passing through the cathode bars in the copper refinery and hence the cathode current values. The cathode bar or cathode current values directly or indirectly obtained are suitable for a plurality of different readouts, including direct and indirect readouts such as for instance a pivoted or swingable indicating needle on an ammeter scale, a transducer which translates pivot shaft rotation into a signal for remote readouts, or electronic scanning, with the result or results indicated, recorded, printed or displayed in any useful way. Further, as previously disclosed herein, a computer can be employed in conjunction with the current measuring instrument herein and especially in conjunction or association with the current measuring apparatus herein having the plurality of current measuring instrument units, the output device of the computer printing out or otherwise recording or writing the information as previously disclosed herein or graphically displaying cathode current values and/or identifying cathodes whose current are above or below predetermined desired or optimum current values or are fluctuating as may be the case where an unstable short circuit or varying resistance contact exists.

The sensing head of the current measuring instrument of this invention preferably utilizes for current measuring purposes the magnetic field created by the current passing through the conductor either inducing a measurable electromotive force and a measurable electrical current in the coil or coils of the sensing head's nonmagnetic jaws by reason of the coil or coils of the jaws cutting the magnetic lines of force during movement of the jaws about the conductor in accordance with Fleming's right hand rule, or, in another embodiment concentrating or inducing the magnetic field in the non-retentive magnetic jaws of the sensing head wherein a movable permanent magnet needle, or a Hall effect element or transducer is utilized to respond to the magnetic field created by the current in the conductor in such manner as to determine the value of the current passing through the conductor. In the electrolytic copper refinery tankhouse, the induction of a measurable e.m.f. and a measurable current in coils of sensing head nonmagnetic jaws with the coils about nonmagnetic cores is preferred as previously mentioned, by reason of not being adversely affected by neighboring magnetic fields in the refinery tankhouse.

A desired current measurement value, which is usually but not necessarily an optimum current measurement value, is determined or calculated for each cathode, and the current measurement value for each cathode bar and hence cathode is compared with this predetermined desired or given current measurement value whereby an abnormal electrical condition or conditions, if occurring, is positively located and its remedying or correcting enabled. In the electrolytic copper refining process, there is usually a plus and minus deviation from a predetermined optimum current measurement value within which one can satisfactorily electro-refine copper, the deviation being decided upon in accordance with practical mechanical, labor, and electrochemical factors applying to the particular electrolytic copper refinery, one particular factor being the cathode "age" or length of time it has been in the tank. For example due to its light weight and tendency in the first several days of its growth to warp, and due to stress relieving by the hot electrolyte, plus and minus deviations from optimum current which one can practically correct would generally be higher than in later days of cathode growth. The predetermined optimum current measurement value for the cathode and hence the cathode bar, is determined from optimum current density and total current carrying surface area of the cathode. Thus if optimum current density is 20 amperes per square foot, then the optimum current for a cathode with a total current carrying surface area of 16.7 square feet is 16.7 multiplied by 20 or 334 amperes. Undesirable results of operation above optimum current density include cessation of current flow due to anode polarization, dendritic short circuiting copper growths from cathode to anode, and increase in impurity levels in cathode copper. The principal undesirable result of operation below optimum current density is below capacity production. Operation with both above and below optimum current density results in unequal anode erosion which further contributes to unequal current density by producing unequal anode to cathode spacing and possible anode structural collapse. Allowance would be made for the practical factors heretofore mentioned affecting current balance among cathodes in a tank or cell, such allowance being, for example, plus or minus 20 percent of optimum current.

The sensing head jaws can be of any suitable shape or configuration, for example arcuate, hemielliptical so as to form an ellipse when closed about the conductor, right angular so as to form a square when closed about the conductor, or generally of any such shapes or configurations. In the measuring of the cathode current in a copper refinery tankhouse, the sensing head jaws of the instrument or instrument units are of such dimensions that the jaws have clearance to pass, when in the open, conductor receptive position, between the cathode bar the current of which is to be measured and two cathode bars laterally spaced at the opposite sides of the first-mentioned cathode bar. Thus the overall width of the sensing jaws, i.e. the distance from the lateral outermost edge portion of one of the jaws to the lateral outermost edge portion of the other jaw, when open is such that the jaws have clearance to pass between the cathode bar the current of which is to be measured and the two cathode bars laterally spaced at the opposite sides of the first-mentioned bar. In closing or clamping about the conductor to effect the measurement of the current passing therethrough, the sensing head jaws may or may not contact the conductor.

The present invention constitutes a considerably improvement in this art by reasons of: (1) rapidly locating and positively identifying cathodes having an abnormal electrical condition or conditions associated therewith, for instance short circuited cathodes or poor contacts, in one or more tanks or cells of the electrolytic copper refinery tankhouse; (2) enabling the remedying of the abnormal electrical condition or conditions associated with the cathodes to be made sooner than by the prior art techniques by reason of (1) supra; (3) attaining a considerably increased production of refined copper in the electrolytic copper refining process; (4) enabling an appreciably more efficient and economical operation of the tankhouse of the electrolytic copper refinery; (5) the instruments rapidly and accurately measuring electrical current passing through a plurality of conductors, or a single conductor, requiring but one hand to operate, requiring only minimal experience, judgement and skill of the meter man for its successful use; (6) the instruments having automatically closeable and automatically openable sensing head jaws and enabling the meter man to relatively rapidly move down the line of cathode bars in the electrolytic copper refinery tankhouse to measuring the direct current passing through each bar; (7) the instruments and apparatus in a preferred form, being virtually unaffected by the magnetic field of other current carrying conductors such as, for instance, adjacent cathode bars and/or high current buses; and (8) the apparatus having the plurality of current measuring instrument units effecting the simultaneous measurement of current through all cathode bars in a tank or cell, in a section, or in the entire tankhouse of the electrolytic copper refinery, or in a plurality but less than all cathode bars in such loci, as desired.

In those embodiments of the invention utilizing a single current measuring instrument of the invention, the present invention enables the operator or meter man with a singlehanded alternately lowering and raising motion and movement of the portable measuring instrument herein, to relatively rapidly move down the line or row of spaced apart cathode bars in the electrolytic copper refinery tankhouse by walking on the cathode bars to measure the direct current passing through the cathode bars and to rapidly locate any cathodes having associated therewith an abnormal electrical condition or conditions, e.g. short circuited cathodes or poor electrical contacts; and to identify such cathodes positively, i.e. admitting of little or no question in identifying the cathode or cathodes as having the abnormal electrical condition or conditions associated therewith.

The current measuring instrument or apparatus of this invention has a range of from 0 to 1,000 amperes in the embodiments having the one or more conductive coils in each jaw of the sensing head, and the model "ASARCO COP" ammeter-containing package or unit connected to the sensing jaw coils. This range renders the instrument or apparatus well suited for the important use of measuring the cathode current in the tankhouse of an electrolytic copper refinery. The current measuring instruments or apparatus of this invention having the non-retentive or "soft" magnetic jaws may also have a range of 0 to 1,000 amperes.

The current measuring instruments and apparatus of this invention is also utilizable for measuring the electrical current passing through any other electrical conductor or conductors, in addition to that through the cathode bars in the electrolytic copper refinery tankhouse, and for any purpose or reason. When the current measuring instrument is utilized, the conductor or conductors may be at any location relative to the meter man, for instance below, above or laterally at the side or sides of the meter man. When the current measuring apparatus having the plurality of current measuring instrument units is utilized, it is imperative that the current carrying conductor or conductors be in a location which requires lowering of the apparatus and its instrument units so that the sensing head jaws of the instrument units substantially encompass the corresponding conductors. The current measuring instruments and apparatus herein has utility in any electrolytic process wherein it is desirable to locate and correct any abnormal electrical condition or conditions, or for any other purpose or reason. Of course the equipment or apparatus utilized in the electrolytic process must be of such structure or construction as to enable the use of the measuring instrument or apparatus herein. Exemplary of known electrolytic processes in which the instrument of this invention is utilizable for electrical current measurement are the processes for the electrolytic production of aluminum (the Hall-Heroult process being but exemplary), electrolytic production of magnesium, electrolytic production of nickel, electrolytic production of manganese, and production of chlorine by the electrolysis of brine, electroplating processes, e.g. the electroplating of zinc, electroplating of nickel, electroplating of silver, electroplating of gold, electroplating of copper, electroplating of cobalt, and the electroplating of alloys thereof, e.g. cobalt-nickel alloys, brass, nickel-copper alloys and nickel-zinc alloys. In the aforementioned electrolytic processes in effecting the electrical current measurement, the sensing head jaws of the measuring instrument of the invention is preferably closed or clamped about an electrical conductor bar or bus bar or other shape conductor connected to and removing electrical current from the cathode. However in the process for the electrolytic production of aluminum, it may be more desirable due to the structure and shape of the process equipment to close or clamp the sensing head jaws about a bus bar or bar-shaped conductor or other shape conductor connected to and supplying electrical current to the anode.

Larger and smaller ranges can be utilized in the current measuring instruments or apparatus of this invention than the 0 to 1,000 ampere range hereinbefore disclosed, and may be indicated for use of the instrument or apparatus for other processes than the electrolytic copper refining process. For example, for use of the instrument having the coils in the sensing head jaws for the measurement of direct current in the electrolytic processes for the production of aluminum, chlorine or magnesium, a larger range for the measuring instrument of up to 10,000 amperes and higher may be required. This higher range of up to 10,000 amperes and higher is provided by increasing the size of the electrical and mechanical components of the instruments, and by modifying the sensing head and current measuring and any other components as may be required.

Where the process voltage levels so dictate, safety considerations may require that electrician's gloves be worn by the meter man or operator in normal operation of the instrument.

In the electrolytic refining of copper the impure copper to be refined is cast in plate form as anodes. The anodes are suspended in electrolytic tanks in the tankhouse in alternation with copper starting sheets suspended from the cathode bars as cathodes and immersed in an electrolyte, usually an aqueous acid solution containing copper sulfate and sulfuric acid. When a direct electrical current is passed through the electrolyte from the anodes to cathodes, the copper is dissolved from the anodes and deposits on the cathode starting sheets. The impurities associated with the impure copper of the anodes collects at the bottom of the electrolizing tanks in the form of anode mud or slime.

BRIEF DESCRIPTION OF THE VIEWS OF THE DRAWINGS

Reference is made to the accompanying drawings wherein:

FIG. 1 is a perspective view of a current measuring instrument of the invention.

FIG. 2 is a vertical sectional view taken on line 2—2 of FIG. 1.

FIG. 3 is a schematic view of the current measuring instrument of FIG. 1 with its sensing head jaws in an open, conductor-receptive position positioned about a cathode bar in the tankhouse of an electrolytic copper refinery.

FIG. 4 is a schematic view of the current measuring instrument of FIG. 1 with the sensing head jaws in an intermediate partially closed position about the cathode bar.

FIG. 5 is a schematic view of the current measuring instrument of FIG. 1 with the sensing head jaws in a final, closed position about the cathode bar.

FIG. 6 is an end elevational view of the lower end portion of the current measuring instrument of FIG. 1.

FIG. 7 is a plan view partly broken away of the hinge means of the current measuring instrument of FIG. 1.

FIG. 8 is an end elevation partly in section of one of the connecting links of the instrument of FIG. 1.

FIG. 9 is a horizontal sectional view taken on line 9—9 of FIG. 6.

FIG. 10 is a vertical sectional view taken on line 10—10 of FIG. 11.

FIG. 11 is a side elevational view of the yoke assembly of the current measuring instrument of FIG. 1 and also showing a crossbar and a shoe of the instrument.

FIG. 12 is a horizontal section through an end portion of one jaw member of the measuring instrument of FIG. 1.

FIG. 13 is a side elevational view of a current measuring instrument in accordance with another embodiment of the invention.

FIG. 14 is a vertical sectional view taken on line 14—14 of FIG. 13.

FIG. 15 is a horizontal sectional view taken on line 15—15 of FIG. 16.

FIG. 16 is an end elevational view of a portion of the support member and hinge member of the current measuring instrument of FIG. 13.

FIG. 17 is a vertical sectional view taken on line 17—17 of FIG. 14.

FIG. 19 is a side elevational view of a current measuring apparatus of yet another embodiment of this invention prior to clamping the apparatus jaws about a plurality of spaced apart cathode bars in the tankhouse of an electrolytic copper refinery, the apparatus comprising a plurality of current measuring instrument units.

FIG. 20 is a side elevational view of the current measuring apparatus of FIG. 19 after clamping or closing of the apparatus jaws about the spaced apart cathode bars.

DETAILED DESCRIPTION

Figure 18:
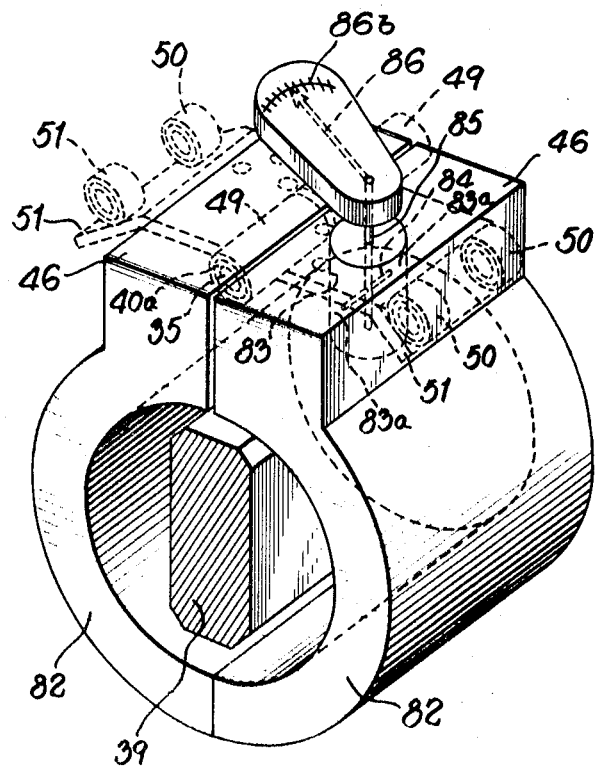
FIG. 18 is a view of the sensing head portion including a current readout device of a current measuring instrument in accordance with still another embodiment of the invention, the sensing head being disconnected from the remainder of the instrument and having its jaws clamped about a cathode bar in the tankhouse of an electrolytic copper refinery.

Referring to FIG. 1, the current measuring instrument comprises elongate supporting tube or handle 15, a yoke assembly 31 including inverted generally U-shaped yoke member 32 movable on the handle, and tong-like sensing head 55 including normally open, conductor receptive, hinged, automatically closeable and automatically openable, tong-like jaws 56 when the instrument is held in a generally vertical orientation with the jaws 56 suspended below the supporting tube. Jaws 56 have electrically conductive coils composed of a multiplicity of windings wound on a non-magnetic or non-magnetizable core, shown in FIGS. 2 and 9 and hereinafter described, and ammeter-containing package 77 is electrically connected to the conductive coils of sensing jaws 56 by suitable conductors. Referring now to FIGS. 1-6 of the drawings, elongate supporting tube or handle 15 comprises upper tubular section 16 of stainless steel attached to lower tubular section 17 of stainless steel by a flexible joint including inner, concentric, smaller diameter, relatively thin wall tube 18 of stainless steel, shown in FIG. 2, intermediate tubes 19 shown in FIG. 2 of compressible flexible material, for instance "Tygon," coaxially aligned between smaller diameter tube 18 and upper handle section 16 and between smaller diameter tube 18 and lower handle section 17, and stainless steel screws 20 with stainless steel double locking nuts inserted through registering apertures in upper section 16, inner tube 18 and tube 19 and in lower section 17, inner tube 18 and tube 19. The flexible joint by which upper handle section 16 is attached to lower handle section 17 functions to prevent the application of damaging force to the mechanism parts or the sensing head hereinafter described applied through supporting tube or handle 15. A handle or hand-gripping assembly 21 comprises stainless steel collar 22 having a sliding fit over upper handle section 16, collar 22 being drilled and tapped to provide two internally threaded apertures or holes each approximately 180° from the other. Two adjustable handle arms 23 of stainless steel each knurled at its outer end portion and threaded at its inner end portion, extend radial to collar 22 and are screwed within the correspondingly internally threaded apertures of collar 22 to lock this handle assembly to upper handle section 16 at any desired location by a jam fit. Compressible discs 24 of a flexible material, for instance "Neoprene," are disposed between the inner ends of arms 23 and the upper handle section 16 to avoid slippage of the handle assembly on the upper handle section. Tubing 25 of "Neoprene" is disposed over arms 23. Crossbar 27 of stainless steel is affixed by a jam fit or by welding or otherwise in a slot in a lower portion of lower tubular section 17 of supporting tube or handle 15, pivot pins 28 being inserted through apertures in its opposite end portions and through transverse, axially aligned registering apertures 62 in the slotted end portions of linkage arms 54, shown in FIG. 8, which receive the crossbar end portions in their slots. Lower section 17 of the supporting tube or handle has a generally inverted T-shape due to its crossbar 27 when the instrument is in a generally vertical orientation with the jaws below the handle.

Yoke assembly 31 comprises inverted generally U-shaped yoke member 32 of stainless steel, shown in FIGS. 1, 6 and 10, welded to yoke sleeve 30 also of stainless steel, which is movable or slideable on the lower section 17 of supporting tube 15. Movable yoke sleeve 30 has slot 29, shown in FIG. 10, in its lower portion with slot 29 being of slightly larger width than the thickness of crossbar 27. Bushing 33 of "Teflon" or another low friction coefficient material is press fitted over the inner surface of sleeve 30 and between handle section 17 and sleeve 30, to permit free movement of the yoke assembly on the lower handle section 17 of the supporting tube. Set screw 40, shown in FIG. 10, threadably removably inserted in a correspondingly threaded opening through sleeve 30 and bushing 33 serves to aid in holding bushing 33 in place. Bushings 34a of "Teflon" are provided in aligned apertures 34 in yoke member 32 for hinge pin or shaft 35. Two spaced apart, elongate crossbars 36, shown in FIGS. 1, 2 and 11, are attached to a lower portion of the legs of the inverted generally U-shaped yoke member 32 by stainless steel screws 37. Crossbars 36, which were of stainless steel and substantially parallel as shown, each extend an appreciable distance laterally beyond the side edges of each leg of yoke member 32, with the lowermost edge of each crossbar, when the instrument is held downwardly with the sensing head below the supporting tube, being above a lower edge of each shoe hereinafter disclosed. The crossbars 36 function to render the apparatus free-standing when the tong-like jaws of the sensing head hereafter described are closed around a conductor such as, for instance, cathode bar 39 in a copper refinery tankhouse, —gravity causing the apparatus to be supported on the two legs of the inverted generally U-shaped yoke member 32 and on one or more of the crossbars 36, to protect the sensing head and mechanism, and to serve with the top of the supporting tube or handle as a three point stable support for the mechanism when laid on a horizontal surface. The length of crossbars 36 can be reduced, if required, to fit between adjacent conductor bars such as the cathode bars 39. Crossbars 36 have apertures 41 for purpose of weight reduction. Inverted generally U-shaped yoke member 32 as shown also has apertures 42 in its legs for weight reduction.

Shoes 43 of an electrically insulating or substantially non-electrically conductive material such as, for instance, "Teflon," are attached to the lower or end portions of the legs of yoke member 32 by screws 44 and extend a short distance beyond the ends of the yoke member legs. Shoes 43 are replaceable by removal of the screws. The electrically insulating material of shoes 43 insulate the mechanism from electrical contact with the electrical current carrying conductor bar 39, when shoes 43 are in contact with the conductor bar 39. Shoes 43 may also be of a more resilient electrically insulating material such as "Neoprene" to reduce impact.

Hinge 45, shown also in FIG. 7, comprises hinge plates 46 of stainless steel each affixed at their inner end upper edge portions by welding to one of annular members or sleeves 49 of stainless steel. Thus, one of the annular members or sleeves 49 is affixed by welding to an inner end upper edge portion of one of the hinge plates 46 and the other annular member or sleeve 49 is affixed by welding to the inner end upper edge portion of the other hinge plate 46. Pivot pin or shaft 35, which is substantially centrally located with reference to the hinge plates 46, extends through bushings 34a fitted in orifices 34 in generally U-shaped yoke member 32 as well as through bushings 40a fitted in the passageways of axially aligned tubular members or sleeves 49, such orifices 34 in yoke member 32 registering with the passageway of sleeves 49. Snap rings 47 of "Teflon," shown in FIG. 6, serve to hold pivot pin 35 in place, and "Teflon" washers designated at 48 in FIG. 6.

Annular members 50 of stainless steel are welded to angular, downwardly bent outer end portions or ears 51 of hinge plates 46. Bushings 52 in the apertures of annular members 50 accommodate the pivot pins 53 for the links 54. The generally arcuate tong-like jaws 56 of the sensing head 55 are secured to hinge plates 46 by screws 57 inserted through holes 58, shown in FIG. 7 and drilled through hinge plates 46, and into tapped holes or cavities in the upper portion of the tong-like jaws 56 and registering with the holes 58 in hinge plates 46. Jaws 56 each include a non-magnetic core having a conductive coil or coils on each core encapsulated in or coated with a substantially continuous layer of a resin which is substantially non-corroding in acid conditions when the instrument is utilized for current measurement in the electrolytic copper refinery tankhouse, or is substantially non-corroding in alkaline conditions or in acid and alkaline conditions when the instrument is employed under those conditions. A suitable material for such layer is an epoxy resin inasmuch as it is substantially non-corroding in both acid and alkaline conditions.

Links 54 are pivotally connected to and link outer end portions of crossbar 27 by pivot pins or shafts 28 inserted through the registering apertures 62 in each link 54 and in crossbar 27 with the outer end portions 51 of the hinge plates 46 and to which hinge plate outer end portions links 54 are also pivotally connected, by pivot pins or shafts 53 inserted through the registering apertures 63 in the other end portions of links 54 and the passageway or apertures through axially aligned annular members 50. Each link arm 54 has a longitudinally slotted or bifurcated end portion 59, shown in FIG. 8, for insertion of crossbar 27 in the slot, with the opposite non-slotted, apertured end portion of each link 54 positioned between the annular members 50. Bushings 60 and 61 of "Teflon" are pressed into apertures 62 and 63 at opposite ends of each link 54. Bushings 60 at the slotted ends of links 54 were pressed into aperture 62 prior to cutting slot 59 in each arm 54. Shiftable collar 65 of stainless steel, which functions to limit the extent of opening of the tong-like jaws 56 and which has a sliding fit on sleeve 30, is secured in the desired location on sleeve 30 by locking screw 66. Cushion washer 67 of "Neoprene" or of any other suitable resilient material is cemented to collar 65 and serves as a cushion or bumper between crossbar 27 upon the opening of jaw members 55 and collar 65. If desired, plates 68 of stainless steel or of other suitable protective material can be secured to links 54 by screws and serve to cover the openings between the legs of yoke member 32 and links 54 to protect the wires 78. Plates 68, present in the instrument of FIG. 2, are detached from the instrument of FIGS. 1 and 3–6 for purpose of clarity in showing detail.

Shiftable collar 69 of stainless steel is disposed on lower handle section 17, collar 69 being locked at a desired or predetermined location on lower handle section 17 by locking screw 72. The closing of jaws 56 around cathode bar 39 results in upward travel of sleeve 30 on lower handle section 17, and the predetermined position of collar 69 locked on lower handle section 17 is such that compressible bumper washer 70 of "Neoprene" atop sleeve 30 cushions and stops the upward movement of sleeve 30 and hence cushions the closing of jaws 55.

When the instrument is to be used to measure current passing through a conductor located overhead or laterally of the meter man, helical spring 73, shown in FIG. 6, is employed and is disposed in compression about the exterior of lower handle section 17, between collar 69 and yoke sleeve 30, spring 73 bearing against an end portion of movable yoke sleeve 30 and against end 71 of collar 69. Compressible bumper washer 70, shown in FIG. 2, is ordinarily not utilized when spring 73 is employed. Collar 69 is locked at a desired or predetermined location on lower handle section 17 to provide the desired degree of compression in spring 73 and hence the desired degree of biasing of or force application against movable yoke sleeve 30 to move in a direction away from the collar end 71, such biasing of yoke sleeve 30 being sufficient to effect the automatic opening of jaws 56 and the maintaining of the jaws in an open position when shoes 43 are not forcefully applied against a conductor. Consequently the tong-like jaws 56, which are pivotally mounted on the inverted generally U-shaped yoke member 32 welded to the yoke sleeve 30, are opened and maintained in their normally open position (except when shoes 43 are forcefully applied against the conductor) in positions of the instrument wherein the sensing head jaws are located above the handle or supporting tube or at the end portion of the supporting tube when held laterally of the meter man as well as in positions of the instrument wherein the sensing head jaws are suspended below the handle or supporting tube, for instance, in the use of the instrument to close its jaws around the electrical conductor located overhead, or located laterally beside the meter man or operator as well as when located below the normal level of the meter man's hands when standing with his arms depending limply at his sides, to measure the electrical current passing therethrough. Further, coil spring 73 serves to cushion the closing impact of the jaws 56 due to increasing compression of spring 73 as the jaw faces meet. When the instrument is to be used only for measuring current through a conductor located below the normal level of the meter man's hands when standing with arms held limply at his sides, for a light compression or no compression position for spring 73, if desired, collar 69 is moved from its solid line heavy compression position, shown in FIG. 6, to the dotted line position where it is locked on lower handle section 17 by locking screw 72.

Jaws 56 of sensing head 55 have electrically conductive coils 75, shown in FIGS. 2 and 9, each composed of a multiplicity of wire windings or turns wound on a non-magnetic core 76. The wire windings of coils 75 are of copper or another metal or material of good electrical conductivity, with the wire being coated with a thin layer of electrically insulating material, for example an electrically insulating enamel layer. The core 76 is of aluminum or any other suitable non-magnetic or non-magnetizable material. Coils 75 on cores 76 are covered with or encapsulated in an electrically-insulating, corrosion resistant, mechanical attack and abrasion-protecting, non-magnetic substantially continuous layer 81 of a material possessing such properties in the layer, for instance a synthetic resin, e.g. an epoxy resin, having such properties or of any other suitable material having such properties in the layer. Layer 81 can be a thin or thick layer and typically is of thickness in the range from one-sixteenth inch to one-fourth inch. Each coil 75 can have one, two, three or more layers of windings or turns, and there can be a single coil in each jaw 56 or two or more coils connected in series. Coils 75 are adapted to be operatively connected with the direct current measuring meter package or unit 77 including an ammeter and, as shown in FIG. 1, are electrically connected to such meter package or unit by conductor wires 78 extending through suitable apertures (not shown) in tong-like jaws 56, through apertures 79a, shown in FIG. 7, in hinge plates 46 and through the hollow handle sections 17 and 16 and the hollow flexible joint therebetween, wires 78 emerging through an aperture 78a or apertures in upper handle section 16 as a flexible lead, coiled or uncoiled, and being electrically connected to meter unit 77 by plug 79, shown in FIG. 1. Wires 78 are provided with male-female splice connectors 78c in the vicinity of the flexible joint section to permit assembly and disassembly of the upper and lower handle sections 16 and 17 respectively and to permit replacement of the wires 78. An envelope 78b of substantially non-electrically conductive sealant material, for instance silicone sealer, is preferably employed to surround an otherwise exposed portion of the wires 78 after they emerge from jaws 56 and hinge plates 46 and before they enter the lower end of the supporting tube lower section 17, for protective and supporting purposes. The ends of coiled flexible sections 78d of wires 78 are also encased in envelopes 78e of the substantially non-electrically conductive sealant material, which restricts flexing of wires 78 to their coiled flexible sections 78d. This avoids wire breakage due to fatigue failures which otherwise may result if bending due to opening and closing of jaws 56 is allowed to concentrate at single points in wires 78. An end plate 88, shown in FIG. 12, is secured by screws to the confronting end face of each jaws 56 to prevent wear due to attrition by contacts with cathode bar 39. End plates 88 can be fabricated of any suitable non-magnetic material, for instance non-magnetic stainless steel.

Meter package or unit 77, which includes an ammeter, is shown in FIG. 1 and obtained from Halmar Electronics, Inc., 1544 West Mound St., Columbus, Ohio as Model "ASARCO" COP. Meter package 77 is battery powered and ready to give a current measurement reading at all times on its scale by means of a pointer which moves over the scale. Meter package 77 contains an ammeter 76, electronic circuit components, switches and battery in the single package. Meter unit 77 has a casing preferably with a relatively short length of tube 80 secured to the back side plate thereof, tube 80 being of slightly larger diameter than the diameter of the tubular upper handle section 16 whereby meter 77 rests on upper handle section 16 as shown. A plug of an elastomer or other suitable flexible material may be inserted in the top of hollow upper handle section 16 for cushioning meter unit 77. Mounting of the meter unit 77 by means of tube 80 and the flexible lead wires 78 emerging from the upper handle section 16 permit removal of the meter unit for operation of the instrument with the meter unit 77 hand held, if desired. Alternatively, the ammeter, switches, battery and electronic circuit components of meter unit 77 may be mounted separately or in various combinations at locations other than the top of upper handle section 16 to suit individual preferance. For example, the ammeter 76 may be mounted facing upward on lower handle section 17 immediately above collar 69 to speed up successive measurements by placing the meter face in the operator's line of sight to the cathode bar 39 which he must observe in placing jaws 56 over the cathode bar 39.

The jaws 56 automatically close about the current-carrying conductor bar 39 by reason of the forceful application of the shoes 43 due to solely the weight of instrument parts including jaws 56 and the yoke assembly 31 against the conductor bar 39 or, if desired, by the weight of the instrument parts together with exertion of force by the operator actuating or causing the yoke assembly 31 including the yoke member 32 to move upwardly or away from the current carrying conductor. In the closing of jaws 56 about the conductor bar 39 a measurable electromotive force and hence a measurable electrical current is induced in the coils of the jaws 56, the magnitude of which is indicative of the amount of electrical current passing through the conductor bar. Upon release of the forceful application of the shoes 43 against the conductor bar 39, the weight of the jaws 56 and yoke assembly and/or the action of the spring 73, if employed, as aforementioned cause the yoke assembly including the yoke member 32 to move downwardly toward the current carrying conductor 39 whereby jaws 56 automatically move to their at rest, normally open position.

In another embodiment of the invention shown in FIG. 18, the current measuring instrument is substantially identical to that of FIGS. 1–6 and previously described herein except that in this embodiment of FIG. 18 the conductive coils in the normally open, conductor receptive tong-like jaws and the wiring leading to the meter unit are not utilized but instead the tong-like jaws 82 are constituted of a non-retentive magnetic material. Non-retentive magnetic jaws 82 are adapted to be operatively associated or coupled with means for measuring the electrical current passing through the conductor as hereafter disclosed. The non-retentive magnetic material of jaws 82 are preferably encapsulated or covered in an electrically insulating, corrosion resistant, mechanical attach and abrasion-protecting, non-magnetic substantially continuous layer of a material possessing such properties, for instance a synthetic resin, e.g. an epoxy resin, having such properties or of any other suitable material having such properties. Such layer can be a thin or thick layer and is typically of thickness in the range of one-sixteenth inch to one-fourth inch. Depression or cavity 83 is provided in the upper portion of jaw 82, depression 83 being of larger diameter than the length of permanent magnet needle 84. Magnet needle 84 is mounted in depression or cavity 83 and is movable on common pivot 85 for purpose of converting magnetic flux into information pertaining relating to the magnitude of the current flow in conductor bar 39. Cavity 83 can be in either one of jaws 82 or partly in each and formed by complementary curved wall portions in each jaw, i.e., with a complementary curved portion in each jaw which together form cavity 83. Air gap 83a is between the inner surface of depression or cavity 83 and permanent magnet needle 84. Depression or cavity 83 extends a major portion of the distance but incompletely through the upper portion of jaw 82 as shown. However this cavity could extend completely through the upper portion of the jaw or jaws, or a lesser or greater distance than shown in FIG. 18 but incompletely through this jaw upper portion. Pivot 85 also has indicating pointer 86 mounted thereon for moving over scale 86b for indicating the magnitude of the current flow in conductor bar 39. The scale 86b is previously calibrated with currents of different amperages passing through the conductor bar encircled by the sensing head jaws. To enable the meter man to readily see the reading on scale 86b, "windows" can be provided in the legs of the inverted generally U-shaped yoke member, not shown in FIG. 18 but shown in FIGS. 2, 10 and 11 and designated at 32 therein, by providing a larger opening in the legs of the yoke member than provided by the weight reducing lower or middle aperture 42, shown in FIGS. 10 and 11, or by forming the upper and middle apertures 42 as a single large aperture but insufficiently large to result in excessive structural weakness. The weight reducing apertures 42, especially the lower aperture, may itself suffice for enabling the meter man to read the scale reading. Instead of a direct flux readout on the scale by the pointer, the readout can be indirect such as by use of a transducer, which translates pivot shaft rotation into a signal for remote readout.

The terms "non-retentive magnetic material" and "retentive magnetic" used herein mean materials characterized by low coercive force, comparatively low hysteresis loss, relatively high permeability, and, usually, a fairly high saturation induction. Such materials are also known as magnetically "soft" materials. Materials included within the meaning of such terms are, for example, ingot iron, cast steel, "Hypernik" and cast iron.

Alternatively, the sensing head jaws of the present invention can utilize one or more Hall effect crystals in the jaws as aforementioned with each having a core of non-retentive magnetic material and associated transducer elements such as employed in "DYN-AMP" direct current metering systems supplied by Halmar Electronics, Inc. of Columbus, Ohio mounted in one or more cavities or air gaps in the core. A voltmeter or other suitable meter calibrated in amperes can be utilized to indicate the value of the current through the conductor encompassed by the jaws.

For measurement of alternating current passing through the conductor, the instrument embodiment of FIG. 18 having the non-retentive magnetic sensing head jaws is utilized provided this FIG. 18 embodiment is first modified as follows. The permanent magnet needle, common pivot mounting the magnet needle and the indicating pointer, indicating pointer and the scale all shown in FIG. 18 are omitted and the depression or cavity designated as 83 in FIG. 18 is so dimensioned as to receive and retain by a snap fit a male member of an ammeter hereafter referred to. Such ammeter measures both alternating current and direct current by the same ammeter. The AC or DC current reading as the case may be is instantly registered on a scale in amperes by a pointer. Such AC and DC ammeter is referred to as a "Scale Range" and is obtainable from Columbia Electric Manufacturing Company, 4519 Hamilton Ave., Cleveland, Ohio 4414. The "Scale Ranges" referred to immediately above have a range of from 0 up to 1,000 amperes, depending on the particular type "Scale Range," for AC and DC current. Type "AX" of such "Scale Range" has a range of from 0 up to 1,000 amperes for both AC and DC current.

In the operation of the current measuring instrument of FIGS. 1–6 to measure current through a conductor requiring holding of the measuring instrument generally vertically with the jaws suspended below the handle arms or handle, the instrument is held by the meter man by handle arms 23 or handle 15 with the tong-like jaws 56 suspended vertically from and below the handle 15, and the weight of the instrument parts including the hinged jaws 56 and yoke assembly including yoke member 32 producing moments of force acting upwardly about pivot pin 35 resulting in the opening of hinge 45 and the automatic opening of jaws 56, with the downward movement of the yoke assembly until stopped by crossbar 27 bearing against cushion washer 67 or collar 65. The extent of down-travel of the yoke assembly including yoke member 32 and of the opening of the hingedly mounted jaws 56 is determined by the position of collar 65 on yoke sleeve 30. Lowering collar 65 on yoke sleeve 30 will reduce the extent of opening of the tong-like jaws 56, whereas raising collar 65 on sleeve 30 will increase the extent of opening of jaws 56.

To close the jaws 56 to substantially encompass the conductor bar 39, the entire instrument is lowered or moved by the meter man in a downward direction and in a fashion such that the open jaws 56 partially surround the conductor bar 39 and the shoes 43 contact the top of conductor bar 39. The forceful application of the shoes 43 against the conductor bar 39 due to weight alone of the instrument parts including jaws 56 and the yoke assembly 31 results in upward movement of the yoke sleeve 30, inverted generally U-shaped yoke member 32, and shoes 43 to produce moments of force acting downwardly about pivot pin 35 which results in the automatic closing or clamping of jaws 56 about conductor bar 39 to substantially surround the bar 39. Motion stops when the end plates 88 at the opposing faces of jaws 56 meet. The entire weight of the instrument now rests on conductor bar 39. Downward force by the meter man may be exerted on the handle 15 but is not required to effect closing of the jaws 56 around the conductor bar.

If the handle of the instrument is now released by the meter man, the instrument will tilt slightly to the right or left to become free-standing by being supported on shoes 43 and on one side or sides of crossbars 36.

When the current measurement is completed with respect the current through the conductor bar, the meter man lifts the instrument by means of handle arms 23 or handle 15 whereby withdrawal of the force application of shoes 43 against conductor bar 39 results in movement downwardly of shoes 43, yoke sleeve 30, and inverted generally U-shaped yoke member 32. Consequently moments of force in the opposite direction are produced about pivot pin 35 whereby force is exerted upwardly through link arms 54 to pivot shafts 53 thereby causing the hinge member ears 51 to move upwardly, hinge 45 to open, and the tong-like jaws 56 to automatically open. The shoes 43 remain in contact with conductor bar 39 until crossbar 27 in slot 29 of the yoke sleeve 30 bears against cushion washer 67 at which time the complete instrument with jaws 56 in full open, conductor receptive, position moves upwardly away from conductor bar 39 and the instrument is again in the ready-to-use state.

When in the operation of the current measuring instrument of FIGS. 1–6 the ready-to-use state or position of the instrument is with the handle 15 held in other than an essentially vertical position with tong-like jaws 15 suspended below such as for measurement of currents in vertical or overhead conductors or conductors located laterally of the meter man, spring 73 between collar 69 and sleeve 30 is employed in compression to hold jaws 56 in the normally open conductor receptive position as is hereinbefore disclosed, and upon contact of the shoes 43 with conductor bar or other conductor the meter man pushes the handle in the direction of the conductor to further compress spring 73 and effect closure of jaws 56 around the conductor. Such closing of the sensing head jaws about the conductor is also referred to herein as automatic closing of the jaws.

The instrument embodiment of FIG. 18 is operated to automatically close or clamp its tong-like jaws 82 about the conductor bar for the current measurement and subsequently to automatically open its jaws and remove them from the conductor bar in substantially identical manner and by substantially identical means as hereinbefore disclosed for the embodiment of FIGS. 1–6. Permanent magnet needle 84 is restrained in a position substantially normal to the direction of induced magnetic flux lines in jaw or jaws 82 generated by the current flow in conductor bar 39 by means of a spring (not shown), and interraction between the induced flux of the jaw or jaws and the flux of permanent magnet needle 84 causes needle 84 to turn or rotate on its pivot an extent proportional to the flux density in the jaw or jaws and hence to the amount of current flow in conductor bar 39.

In still another embodiment of the current measuring instrument of this invention, with reference now to FIGS. 13, 14 and 17, normally open, hinged, tong-like jaws of the sensing head 90 are designated at 91, an immovable, inverted generally U-shaped first yoke is designated at 92, and an immovable inverted generally U-shaped second yoke at 93. The first and second yokes 92 and 93 respectively each include first and second yoke members 92a and 93a respectively of stainless steel, each of yoke members 92a and 93a having a generally vertical lower portion, a generally horizontal upper portion, and a curved or arcuate portion intermediate the upper and lower portions. The generally vertical lower portion of second yoke members 93a terminates a substantial distance below hinge means hereafter specified. First yoke 92 is secured by welding at its yoke members' upper end portions to a lower portion of the handle or supporting tube 140, whereas second yoke 93 is secured at its yoke members' upper end portions to the horizontal upper portion of first yoke 92 by means of screws 94. Alternatively, second yoke 93 may have its yoke members secured at their generally horizontal upper end portions to a lower portion of supporting tube 140 by welding at points of securing spaced from that of the first yoke members. Yoke members 92a of first yoke 92 are secured at their lower end portions by screws to outer end portions of hinge plate halves 98. Jaws 91 of the sensing head 90 are of generally arcuate, tong-like shape, are normally open for reception of the conductor, and are automatically closeable and automatically openable when the instrument is in a generally vertical orientation with the jaws below the supporting tube 140. Each of jaws 91 has conductive coils 145, shown in FIG. 14, composed of a multiplicity of windings of copper wire or other suitable electrically conductive wire wound on a non-magnetic or non-magnetizable core of aluminum or another non-magnetic or non-magnetizable material, and are similar or substantially identical to the jaws of the sensing head of the embodiment of FIGS. 1–6. Coils 145 of jaws 91 are adapted to be operatively connected with electrical current measuring means hereinafter disclosed. Yoke members 93a of the second yoke 93 have spaced apart, opposite channels or open ended slots 99 in their lower portions, with channels or open ended slots 99 communicating the exterior of the second yoke members 93 with the top of slots 99, corresponding in position with each other, and also registering or corresponding in position with axially aligned apertures or bores 96a through hing plate halves 98. Jaws 91 are normally open in the at rest or ready-to-use, conductor receptive state and, when closed, substantially encompass the conductor, such as cathode bar 116 in the electrolytic copper refinery tankhouse.

Hinge means 95 has pivot pin or shaft 96 inserted through registering bores 96a through complementary hinge plate halves 98, also shown in FIG. 15. Hinge plate halves 98 mount tong-like jaws 91 by being attached to the upper portion of jaws 91 by screws inserted through apertures 91a in hinge plate halves 98. Pivot pin 96, which is substantially centrally disposed with reference to the hinge means, extends through registering bores 96a in an inner end portion of each of hinge plate halves 98 with each aperture or bore 96a being of slightly larger diameter than that of pin 96. Pivot pins or shafts 97 extend through registering bores 97a in ears 98a, shown in FIG. 15, in the movable, bifurcated or eared outer end portion of hinge plate halves 98 and in the immovable intermediate hinge portions 117, shown in FIG. 16, located between the ears 98a of hinge plate halves 98. The first yoke members 92a of first yoke 92 are secured at their lower portions by screws 106 to the immovable hinge portions 117. Snap rings 139 aid in retaining hinge pins 97 in place in ears 98a and intermediate hinge portions 117.

Pivot pin 96 extends through the spaced apart, opposite slot apertures 99 in the second yoke members 93a of second yoke 93 and is moveable in the slots 99 as hereinafter described, pivot pin 96 also extending through apertures 99a in the third yoke members 100a of moveable, inverted generally U-shaped third yoke 100. The third yoke 100 is unsecured to the handle or supporting tube 140 at its upper portion, with supporting tube 140 extending through an aperture or hole 141 of larger diameter than that of the supporting tube 140 in the horizontal upper portion of third yoke 100. Third yoke 100 is disposed above and laterally outwardly of the corresponding portions of second yoke 93. Shoes 101 of a substantially non-electrically conductive material such as that previously disclosed herein are secured by screws to the lower portion of each yoke member 100a of third yoke 100. Washers are designated at 102 and snap rings at 103, snap rings 103 aiding in retaining the lower portions of third yoke 100 and second yoke 93 on pivot pin 96. Collar 105 of stainless steel is slideable on supporting tube 140 and is held in the desired position on supporting tube 140 between the second and third yokes by set screw 143. Bumper-washer 144 of a resilient material, for instance, "Neoprene," or any other suitable resilient material, is secured to the upper portion of collar 105 by cementing, and serves as a bumper for the upper horizontal portion of third yoke 100 at the end of its downward movement. Screws 109 are threadably engaged through correspondingly internally threaded apertures in the vertical portion of yoke members 100a of third yoke 100, with screws 109 projecting into slots 110 in yoke members 93a of second yoke 93 to prevent rotation of third yoke 100 about hinge pin 96. The width of each slot 110 is only slightly larger than the diameter of the male portion of each screw 109. Electrically conductive wires 112 lead from the coil or coils 145 in the jaws 91 and pass through orifices 112a in hinge plates 98 and upwardly within the enclosed space of tubular supporting handle or tube 140, to emerge similarly as is previously disclosed herein with regard the instrument of FIGS. 1–6 through an aperture or apertures in an upper tubular section of supporting tube 140 to electrically connect the coils of jaw 91 with a suitable meter package or unit, such as the model "ASARCO" COP ammeter-containing package previously referred to herein and obtainable from Halmar Electronics, Inc. of Columbus, Ohio. Spaced holes 113 in yoke members 100a of third yoke 100 are for weight reduction purpose.

Crossbars 114 also secured to a lower portion of each yoke member 100a of third yoke 100, are of substantially identical structure and serve a substantially identical function as the corresponding crossbars 36 of the instrument embodiment of FIGS. 1–6 and previously described herein. Envelopes 115 of substantially non-electrically conductive sealant material, for instance silicone sealer, preferably surround otherwise exposed portions of wires 112 for protecting and supporting wires 112. When the instrument is to be used to measure current passing through a conductor located overhead or laterally of the meter man instead of below the normal level of the meter man's hands when standing with his arms depending limply at his sides, movable collar 150 is locked at a predetermined location on the lower portion of supporting tube 140 by locking screw 151 and helical spring 152 is disposed in a compressed state about supporting tube 140 between collar 150 and third yoke 100. Spring 152 bears against the horizontal portions of movable third yoke 100 and against the end of collar 150, and the location of collar 150 locked on handle 140 is such that is provides the desired degree of compression in spring 152 and hence the desired degree of biasing of movable third yoke 100 in a direction away from the collar 150. Consequently the jaws 91 are maintained in their normally open position (except when shoes 101 are forcefully applied against the conductor) in positions of the instrument wherein the sensing head jaws are located above the handle or supporting tube or at the end portion of the handle or supporting tube when held laterally of the meter man as well as in positions of the instrument wherein the sensing head jaws are suspended below the handle or supporting tube. The remainder of the direct current measuring instrument of FIGS. 13, 14 and 17 including the supporting tube or handle assembly above the yoke arms and the tong-like jaws is substantially identical to that of the instrument embodiment of FIGS. 1–6 previously disclosed herein.

In the operation of the current measuring instrument of FIGS. 13, 14 and 17, with tong-like jaws 91 of sensing head 90 in their normally open, ready-to-use, conductor-receptive position, the operator or meter man lowers the instrument by means of the supporting tube or handle 140 with only one required, to position the open jaws 91 about the cathode bar 116 in the tankhouse of an electrolytic copper refinery. After shoes 101 contact cathode bar 116, and with forceful application of shoes 101 against cathode bar 116 due solely to the weight of the instrument parts including the sensing head jaws 91 and the third yoke 100, pivot pin 96 is forced upwardly in slot 99, shown in FIGS. 14 and 17, from its broken line position, shown in FIGS. 13 and 17, to its solid line position thereby producing moments of force acting downwardly about pivot pin 96 and automatically closing jaws 91 about cathode bar 116, and involving movement of jaws 91 from their broken line open position to their solid line closed position. Force may be exerted on shoes 101 by the operator through the supporting tube or handle, if desired, but is not required. As jaws 91 close to substantially encompass cathode bar 116, their coils 145, shown in FIG. 14, of electrically conductive wire cut across the magnetic line of force around cathode bar 116 and created by the direct electrical current passing through bar 116 thereby inducing a measureable electromotive force and a measureable electrical current in the coils. The operator then notes the current measurement reading on the visible scale of the ammeter-containing package or unit, which preferably is mounted on the handle or supporting tube 140 as previously disclosed herein with regard the embodiment of FIGS. 1–6. When the instrument of FIGS. 13, 14 and 17 is used to measure the current passing through a conductor located overhead or laterally of the meter man, upon contact of the shoes 101 with the conductor 116, the meter man pushes the handle or supporting tube 140 in the direction of the conductor bar 116 to further compress spring 152 and effect closure of jaws 91 around cathode bar 116. Such closure of jaws 91 to substantially encompass bar 116 is referred to herein as automatic closing of the jaws.

The operator then lifts the instrument from the cathode bar 116 by means of supporting tube 140, with only one hand required, whereby the forceful application of the shoes 101 against cathode bar 116 is withdrawn or released and the weight of the instrument parts including jaws 91 and third yoke 100 cause hinge pin 96 to move downwardly in slot 99 whereby moments of force act upwardly about pin 96 and jaws 91 automatically open to their normally open, conductor-receptive position. Shoes 101 are ultimately raised out of contact with bar 116 as the instrument is lifted higher. The operator then repeats the procedure on the other cathode bars to measure the direct current passing therethrough.

With reference to the current measuring apparatus 155 of FIGS. 19 and 20, in accordance with still another embodiment of this invention, a plurality of electrical current measuring instrument units 120 depend from common supporting rack or frame 126 of stainless steel. Each current measuring instrument unit comprises the common supporting rack or frame 126, a normally open, conductor-receptive, tong-like sensing head 131 capable of utilizing the magnetic field created by the electrical current passing through the cathode bars 122 in the electrolytic copper refinery tankhouse for current measuring purposes, and generally vertical support arms 123 of stainless steel moveable on the supporting rack 126 and supporting the sensing head jaws 121. Normally open, conductor receptive, automatically closeable and automatically openable tong-like jaws 121 of each sensing head substantially encompass each cathode bar 122 for the current measuring.

Jaws 121 each have a non-magnetic core, for example of aluminum or other suitable non-magnetic or non-magnetizable material and one or more electrically conductive coils 136 each composed of a multiplicity of wire windings or turns wound on the non-magnetic core. The wire windings of coils 136 are of copper or of another metal or material of good electrical conductivity, with the wire coated with a thin layer of electrically insulating material, for example an electrically insulating enamel layer. Coils 136 on the non-magnetic cores are covered with or encapsulated in an electrically insulating, corrosion resistant, mechanical attack and abrasion-protecting, non-magnetic layer (not shown) of a material possessing such properties in the layer, for instance a synthetic resin, e.g., an epoxy resin, having such properties or of any other suitable material having such properties in the layer. This electrically insulating, corrosion resistant, mechanical attack and abrasion-protecting, non-magnetic layer over coils 136 can be substantially identical to the corresponding layer 81, shown in FIGS. 2 and 9, over the coils 75 of the sensing head jaws of the other embodiment of the apparatus of this invention and can be a thin or thick layer and is typically of thickness in the range of one-sixteenth inch to one-fourth inch. Each coil 136 can have one, two, three or more layers of windings or turns, and there can be a single coil in each jaw 56, or two or more coils, connected in series. End plates 154 of a suitable wear-resistant, non-magnetic material, for instance non-magnetic stainless steel are affixed to the confronting end faces of jaws 56 by screws to prevent wear due to attrition by contacts with cathode bar 122.

Generally vertical support arms 123 are pivotally connected or linked at their lower end portions to outer end portions of hinge plates 124, the stainless steel hinge plates 124 being secured to sensing head jaws 121, and hence support arms 123 support the sensing head jaws 121. Support arms 123 extend through openings or orifices 125 in supporting rack or frame 126 and are movable on the rack or frame 126 for providing automatic adjustment of the instrument to accommodate any differences in heights of cathode bars 122. Support arms 123 have heads or crosspieces 128 each of appreciably larger diameter than that of each orifice 125, so as to maintain the heads 128 on the opposite side of supporting rack 126 from the jaws of each instrument unit.

Pivot pin or shaft 146 is substantially centrally disposed with reference to the hinge means, and hingedly or pivotally mounts hinge plates 124 and hence jaws 121 on the leg members 148. Pivot pin 146 extends through bushings fitted in passageways of two axially aligned annular members or sleeves 147 of stainless steel as well as through bushings fitted in orifices in the upper portion of two spaced apart leg members 148 of stainless steel, such orifices in rigid leg members 148 registering with the passageways of sleeves 147. One of the annular members 147 is affixed by welding to the inner end upper edge portion of one of hinge plates 124, and the other annular member or sleeve 147 is affixed by welding to the inner end upper edge portion of the other hinge plate 124. Pivot pins or shafts 149 are inserted through bushings fitted in spaced apart axially aligned annular members 150 of stainless steel and also through bushings fitted in registering orifices or apertures in the lower end portions of support arms 123, the apertured lower end portions of support arms 123 being inserted between the spaced apart annular members 150. Annular members 150 are welded to the outer end portions of hinge plates 124. The location of the annular members 147 and the annular members 150 on hinge plates 124 is substantially identical to the location shown in FIG. 7 for the corresponding annular members 49 and annular members 50 in the other embodiment of the apparatus of the invention previously disclosed herein and the structure of such annular members 147 and annular members 150 is similar to that of the corresponding annular members 49 and annular members 50 shown in FIG. 7.

Shoes 127 of substantially non-electrically conductive material, e.g., "Teflon," are attached or fastened to the lower end portions of leg members 148 by screws or other suitable fastening means. Shoes 127 have outwardly diverging sidewalls 127a for automatic adjustment of and assuring registering and forceful application and retention of shoes 127 against the cathode bars 122 when the apparatus is lowered, when one or more of the cathode bars 122 are abnormally spaced or out of position with respect its vicinal cathode bar 122.

Supporting cables 129 and 130 are connected to eye-bolts 132 and 132a inserted in and affixed to the opposite end portions of rack or frame 126, cables 129 and 130 also being connected to common loop or ring 133. A lifting hook of a crane (not shown) is designated at 134.

Any desired or required number of the current measuring instrument units can be included in the apparatus of FIGS. 19 and 20. Preferably the current measuring apparatus of FIGS. 19 and 20 includes a number of the current measuring units corresponding to the number of cathode bars or other conductors the current flow through which it is desired to measure. Thus, for example, if the tank in the electrolytic copper refinery tankhouse has 30 cathode bars, the measuring apparatus preferably has 30 instrument units; if such tank has 40 cathode bars, the measuring apparatus preferably has 40 instrument units; if two tanks each having 30 cathode bars are to be measured for electrical current flow simultaneously, the measuring apparatus preferably has 60 instrument units; etc.

Coils 136 of the jaws 121 of the sensing heads are adapted to be operatively connected to electrical current measuring means and are so connected by conductor wires 138 to current measuring meter packages or units (not shown), such as for example current measuring ammeter packages or units, mounted on rack 126. Wires 138 extend through apertures in hinge plates 124 and in the common supporting rack 126. The current measuring meter packages on rack 126 may be connected by flexible conductor cable 137 to the input device of a computer located on the crane, or on the bridge or crane straddling the tank or tanks if employed instead of the crane, or in any other suitable locus, and in this event a readout apparatus 153 or print out device or any other suitable output device of the computer displays, prints out, or otherwise records the current measurement values for the cathode bars 122. Any means for simultaneously obtaining direct or indirect readout or print out or other recordal of the measurement values of the current through the cathode bars and from which current distribution among the cathodes can be determined is utilizable in the apparatus of FIGS. 19 and 20, with the current measuring ammeter packages or units with or without the computer including the input and output devices being but exemplary.

In operation, the current measuring apparatus of FIGS. 19 and 20 is lowered by the crane by means of its hook 134, supporting cables 129 and 130, and ring 130 in such manner that shoes 127 of the instrument units 120 are brought into contact with cathode bars 122 in the electrolytic copper refinery tankhouse. The resultant forceful application of shoes 127 against cathode bars 122 with continued lowering of the apparatus and due at least in part to the weight of the apparatus parts including the sensing head jaws 121 and leg members 148 results in upward movement of the leg members 148 to produce moments of force acting downwardly about pivot pin 146 thereby resulting in movement of jaws 121 to a closed position substantially encompassing cathode bars 122. During the closing of jaws 121 about the cathode bars 122, the coils 136 of the jaws cut the magnetic lines of force about each bar 122, and induce a measurable e.m.f. and a measurable current in the coils 136. The current measuring ammeter packages on the supporting rack measures the current through each cathode bar 122, and the current measurement values are shown by a pointer on the scale of each package. In the preferred embodiment, the current measurement values for the cathode bars 122 are shown for readout by the readout device or apparatus 15, or printed out or otherwise displayed or recorded by another suitable output device of the computer. By reason of the measurement of the current through the cathode bars 122, any cathode bar or bars and hence the corresponding cathode or cathodes suspended from the cathode bar or bars whose currents are above or below a predetermined desired current measurement value, which may or may not be but usually in an optimum value, or are fluctuating above and below the predetermined desired or optimum current measurement value, as may be the case where, for example, a short circuited cathode or cathodes or a poor electrical contact or a varying resistance contact exits, are positively identified. The remedying of such abnormal electrical condition or conditions associated with the cathode is thereby enabled.

After the measurement of the current through the cathode bars and hence cathodes is completed, the current measuring apparatus of FIGS. 19 and 20 is lifted or raised upwardly by the crane by means of its hook 134, supporting cables 129 and 130, and ring 133 whereby there is withdrawal of forceful application of shoes 127 against the cathode bars and shoes 127 and legs 148 move downwardly. Due to the weight of the apparatus parts including sensing head jaws 121 and leg members 148, moments of force are produced which act upwardly about the pivot pin 146. Consequently the jaws 121 open to their normally open, conductor receptive position and ready for the next current measurements. Shoes 127 ultimately move out of contact with the cathode bars 122 on continued raising of the apparatus.

For purpose of flexibility, the instrument units 120 can be readily removed or added to the apparatus as desired or required by providing each head 128 with an internally threaded nipple affixed to the lower surface of the head normal thereto, for instance by welding, or an internally threaded aperture, and which head 128 is screwed onto correspondingly threaded upper end portion of each support arm. Consequently, merely by unscrewing the heads 128 from the support arms 123 and disconnecting the conductor wires 138 from the current measuring ammeter unit on the rack 126, any one or more of the instrument units can be removed from, or added by the reverse procedure, to the supporting rack 126.

The above-described current measuring apparatus of FIGS. 19 and 20 also constitutes a considerable and meritoreous improvement in the copper electrorefining art for the reason, which is in addition to those previously set forth herein, that its use results in reducing the disturbance of electrical contacts and reducing slimes fall by reducing or eliminating walking on the cathode bars by the meter man. Further its use enables an appreciable increase of circuit amperage inasmuch as the better or more perfect the balance of current among the cathodes, the more the circuit current can be increased without exceeding current densities where polarization and other adverse effects become limiting. Consequently the production of refined copper is materially increased, as each one percent increase in circuit current in the tankhouse amounts to a one percent increase in refined copper production with the same plant and labor.

In a 13 ½ day test in the tankhouse of a major copper refinery of the applicant's assignee, the direct current measuring instrument having the normally open sensing head jaws of this invention and as shown in FIGS. 1–6 herein was used for current efficiency work on one-half of the tanks in two sections of the refinery, with each section having 34 tanks or cells, and the standard millivoltmeter of the prior art was used on the other half of the tanks in these two sections. In each case one-half of the tanks, i.e., 17 in number, were on the section side with new anodes, i.e., anodes immersed in the tank electrolyte up to and including 14 days, and the other half, i.e., 17 in number, were on the section side with old anodes, i.e., anodes immersed in the tank electrolyte 15 to 28 days inclusive. The measuring instrument of this invention was used by clamping the normally open tong-like jaws of its sensing head about the cathode bar by the operator or meter man lowering the instrument by hand until the open jaw members were positioned about the cathode bar and the instrument's shoes contacted the cathode bar, whereupon release of upward supporting force on the instrument's handle by the operator caused the tong-like jaws to automatically close about the cathode bar, and the cathode current was observed by the operator on the visible scale of the ammeter package. Cathodes were marked by the operator for corrective procedures by others when amperage 20 percent above or below the normal cathode current was encountered, the experience, skill and judgement of the operator not being depended upon to identify abnormal conditions.

The standard millivoltmeter was used in the usual manner by the operator to read millivolts between adjacent anodes and cathodes, the millivolts commonly being in the 200 millivolt range but with no exact predetermined desired or optimum millivolt value to be compared with in any case and the experience, skill and judgement of the operator was depended upon to identify abnormal conditions.

The tanks in the two sections worked with the direct current measuring instrument of FIGS. 1–6 of this invention yielded a higher current efficiency than the tanks in the two sections worked with the millivoltmeter. Specifically the tanks in the first section which were worked with the current measuring instrument of this invention yielded a current efficiency 4.4 percent higher than that of the tanks in such first section which were worked with the standard millivoltmeter. The tanks in the second section which were worked with the current measuring instrument of this invention yielded a current efficiency 3.4 percent higher than that of the tanks of such second section which were worked with the standard millivoltmeter.

On the basis of all 72 sections in a 20,000 ton per month refinery tankhouse obtaining the average 3.9 percent increase in current efficiency obtained on these two sections, the calculated monthly refinery tonnage increase of cathodes would be 3.9 percent of 20,000 or 780 tons.

The current measuring instrument of FIGS. 1–12 herein may have the following dimensions: the upper and lower sections 16 and 17 respectively of the supporting tube 15 each of ¼ inch O.D. × 0.049 inch wall thickness and 32 inches long and 6 inches long respectively; tubes 19 of compressible flexible material each of ⅜ inch I.D. × ⅝ inch O.D. and 4 inches long; inner tube 18 of ⅜ inch O.D. × 0.028 inch wall thickness; handle collar 22 of ¾ inch I.D. × 1 ⅛ inches O.D. × 7/16 inch thickness; compressible discs 24 each of ¼ inch diameter, 1/16 inch thickness; handle arms 23 each of ¼ inch diameter × 2 inches long; tubing 25 of 3/16 inch I.D. × 1/16 inch wall thickness and 1 ¾ inches long; crossbar 27 2 ½ inches long × ⅝ inch high × ⅛ inch thick; pivot pins 28 each of ⅛ inch diameter × 11/16 inch long; slot 29 of sleeve 30 15/16 inch high × ⅛ inch wide; sleeve 30 of 1 inch O.D. × 0.083 wall thickness × 2 ⅛ inches long; inverted generally U-shaped yoke member 32 6 ½ inches high × 2 ½ inches opening × 1 ½ inches wide × ⅛ inch thick; pivot pin 35 of 3/16 inch diameter × 2 ⅞ inches long; crossbars 36 each 10 inches long × ¾ inch high × ⅛ inch thick; hinge plates 46 each 1 ¾ inches long × 1 ¼ inches wide × ⅛ inch thick; annular members 50 each of ½ inch O.D. × ⅛ inch I.D. × ¼ inch long; pivot pins 53 for the links 54 each of ⅛ inch diameter × 1 5/16 inches long; links 54 each ⅜ inch wide × ⅜ inch thick × 4 inches long, with the slot in the bifurated end portion 59 of each link 54 3/16 inch wide × ⅜ inch long × ⅝ inch deep; tong-like jaws 55 each of 1 ⅞ inches outside radius, 1 ⅛ inches inside radius, ¾ inch thick, 2 inches wide, and having an upper rectangular top section 1 ¼ inches long × 2 inches wide for hinge attachment; collar 65 for limiting the extent of opening of jaws 56 of 1 ⅝ inches O.D. × 1 inch I.D. × ½ inch thick; shiftable collar 69 of 1 ⅛ inches O.D. × ¾ inch I.D. × 7/16 inch thick; coil spring 73 of 1 inch diameter, 3/16 inch pitch, ¾ inch long, No. 14 AWG wire; and end plate 88 ⅜ inch wide × 2 inches long × 0.02 inch thick with a ⅛ inch × 0.02 inch thick circumferential flange extending a short distance about the outer edge portion of the jaw to protect same. Each conductive coil 75 of the sensing head jaws may have approximately 20,000 turns, although a greater or lesser number of turns in each coil can be used.

In the current measuring instrument of FIG. 18, the depression or cavity 83 in the sensing head jaw 82 may have dimensions of ⅝ inch diameter × 1 ⅛ inches deep, the permanent magnet needle 84 dimensions of 1/32 inch diameter by ⅜ inch long, and the pivot 85 a length of 2 inches.

The current measuring instrument of FIGS. 13, 14 and 17 may have the following dimensions; tong-like jaws 91 each 4 inches long, 2 inches deep, ¾ inch thick, first yoke 92 of 4 inches opening, 1 ½ inches deep, 3 inches high, 150 inch thick, second yoke 93 of 2 ¼ inches opening, 1 ½ inches deep, 3 ⅝ inches high, ⅛ inch thick, slot apertures 99 of second yoke 93 each of ¾ inch length, 7/32 inch width, hinge plate halves 98 each 2 3/16 inches long, 2 inches wide, ½ inch thick, pivot pin 96 of 3/16 inch diameter, 3 1/16 inches long, third yoke 100 of 2 ½ inches opening, 1 ½ inches deep, 6 inches high, ⅛ inch thick, shoes 101 each of 1 ½ inches length, ¼ inch wide, 9/16 inch height, slots 110 each of ¾ inch length, 5/32 inch wide, and cross bars 114 each of 10 inches length, ¾ inch height, ⅛ inch thick.

The term "rapidly" used in the appended method claims to modify the locating and identifying of cathodes having abnormal electrical conditions associated therewith in the electrolytic copper refinery tankhouse, and also to modify the sensing and measuring of the direct electrical current through the cathode bar or bars, means that the locating and identifying of such cathodes having abnormal electrical conditions associated therewith and the sensing and measuring of the direct current through the cathode bars is accomplished in materially less time than was required by use of prior "clamp-on" ammeters referred to previously herein in the "Description of the Prior Art."

While certain novel features of the invention have been disclosed herein and are pointed out in the annexed claims, it will be understood that various omissions, substitutions and changes may be made by those skilled in the art without departing from the spirit of the invention.

What is claimed is:

1. Apparatus for measuring electrical current passing through at least one conductor which comprises at least one electrical current measuring instrument, the measuring instrument comprising:
   a. supporting means;
   b. a normally open sensing head capable of utilizing a magnetic field created by the current passing through the conductor for current measuring purposes, said sensing head having normally open, conductor receptive, pivotally mounted, automatically closeable and automatically openable jaws at least when the instrument is in a generally vertical orientation with the jaws below the supporting means, the jaws when closed substantially encompassing the conductor for the current measuring;
   c. means moveable on the supporting means of (a) and supporting the normally open sensing head jaws;
   d. means pivotally mounting the jaws on the last-mentioned moveable supporting means;
   e. means connecting outer end portions of the pivoted jaw mounting means with the supporting means;
   f. means maintaining the jaws in an open position when contacting means hereafter specified is not forcefully applied against a solid surface; and
   g. contacting means attached to the last-mentioned moveable supporting means, forceful application of the contacting means against a solid surface effecting movement of the moveable supporting means in a direction resulting in the closing of the jaws to substantially encompass the conductor and withdrawal of the forceful application of the contacting means from against the solid surface resulting in movement of the moveable supporting means in a different direction to effect the opening of the jaws at least when the instrument is in a generally vertical orientation with the jaws below the supporting means;
   h. the sensing head adapted to be operatively associated with means for measuring the electrical current passing through the conductor.

2. An instrument for measuring electrical current passing through a conductor, which comprises:
   a. supporting means;
   b. a normally open sensing head capable of utilizing a magnetic field created by the current passing through the conductor for current measuring purposes, said sensing head having normally open, conductor receptive, pivotally mounted, automatically closeable and automatically openable jaws at least when the instrument is in a generally vertical orientation with the jaws below the supporting means, the jaws when closed substantially encompassing the conductor for the current measuring;
   c. means moveable on the supporting means of (a) and supporting the normally open sensing head jaws;
   d. means pivotally mounting the jaws on the last-mentioned moveable supporting means;
   e. means connecting outer end portions of the pivoted jaw mounting means with the supporting means;
   f. means maintaining the jaws in an open position when contacting means hereafter specified is not forcefully applied against a solid surface; and
   g. contacting means attached to the last-mentioned moveable supporting means, forceful application of the contacting means against a solid surface effecting movement of the moveable supporting means in a direction to result in the automatic closing of the jaws to substantially encompass the conductor and withdrawal of forceful application of the contacting means from against the solid surface resulting in movement of the moveable supporting means in a different direction to effect the automatic opening of the jaws when the instrument is in a generally vertical orientation with the jaws below the supporting means;
   h. the sensing head adapted to be operatively associated with means for measuring the electrical current passing through the conductor.

3. An instrument for measuring direct electrical current passing through a conductor, which comprises:
   a. supporting means;
   b. a normally open sensing head capable of utilizing a magnetic field created by the current passing through the conductor for current measuring purposes, said sensing head having normally open, conductor receptive, hinged, automatically closeable and automatically openable jaws when the instrument is in a generally vertical position with the jaws below the supporting means, the jaws when closed substantially encompassing the conductor for the current measuring;
   c. moveable yoke means including an inverted generally U-shaped yoke member moveable on the supporting means and supporting the normally open sensing head jaws;
   d. hinge means including a substantially centrally disposed, with reference to a upper portion of the hinge means, pivot pin hingedly mounting the jaws on the movable yoke means yoke member;
   e. link means pivotally interconnecting and linking outer end portions of the hinge means with a lower portion of the supporting means;
   f. means maintaining the jaws in an open position when contacting means hereafter specified is not forcefully applied against the conductor; and
   g. contacting means of a substantially non-electrically conductive material attached to a lower portion of the yoke means yoke member and extending beyond the yoke member end, forceful application of the contacting means against the conductor effecting movement of the yoke member in a direction to result in closing of the jaws to substantially encompass the conductor, and withdrawal of forceful application of the contacting means from against the conductor resulting in movement of the moveable yoke member in an opposite direction when the instrument is in a generally vertical orientation with the jaws below the supporting means, to effect opening of the jaws;

h. the sensing head adapted to be operatively associated with means for measuring the electrical current passing through the conductor.

4. An instrument for measuring direct electrical current passing through a bar conductor, which comprises:
 a. an elongate handle;
 b. a normally open tong-like sensing head capable of utilizing a magnetic field created by the current passing through the conductor for current measuring purposes, said sensing head having normally open, conductor receptive, hinged, tong-like, automatically closeable and automatically openable jaws when the instrument is in a generally vertical orientation with the jaws below the handle, the jaws when closed substantially encompassing the conductor for the current measuring;
 c. a moveable yoke assembly including an inverted generally U-shaped yoke member moveable on the handle and supporting the normally open sensing head jaws;
 d. hinge means hingedly mounting the jaws on the inverted generally U-shaped yoke member, said hinge means including hinge plates secured to upper portions of the jaws by a substantially centrally disposed, with reference to the hinge means, pivot pin extending through the passageways of axially aligned sleeves each affixed to an inner end portion of a different hinge plate and through registering orifices in the inverted generally U-shaped yoke member;
 e. link means pivotally interconnecting and linking outer end portions of the hinge means hinge plates with a lower portion of the handle;
 f. the weight of instrument parts including the sensing head jaws and the moveable yoke assembly maintaining the jaws in an open position when shoes hereafter specified are not forcefully applied against the conductor;
 g. means limiting the extent of opening of the jaws but allowing them to open sufficiently wide to enable said jaws to be positioned about the conductor; and
 h. shoes of a substantially non-electrically conductive material attached to a lower portion of the inverted generally U-shaped yoke member and extending beyond the yoke member end, forceful application of the shoes against the conductor effecting movement of the moveable yoke assembly in a direction to produce moments of force about the centrally disposed pivot pin thereby resulting in closing of the jaws to substantially encompass the conductor and withdrawal of the forceful application of the shoes from against the conductor resulting in movement of the moveable yoke assembly in an opposite direction thereby resulting in opening of the jaws when the instrument is in a generally vertical orientation with the jaws below the handle;
 i. the sensing head adapted to be operatively associated with means for measuring the electrical current passing through the conductor.

5. An instrument for measuring direct electrical current passing throug a bar conductor, which comprises:
 a. an elongate handle;
 b. a normally open, tong-like sensing head capable of utilizing a magnetic field created by the current passing through the conductor for current measuring purposes, said sensing head having normally open, conductor receptive, hinged, tong-like, automatically closeable and automatically openable jaws when the instrument is in a generally vertical orientation with the jaws below the handle, the jaws having generally arcuate inner surfaces, said jaws when closed substantially encompassing the conductor for the current measuring;
 c. moveable yoke means including an inverted generally U-shaped yoke member moveable on the handle and supporting the normally open tong-like jaws;
 d. hinge means hingedly mounting the jaws on the moveable yoke means yoke member, said hinge means including hinge plates secured to upper portions of the jaws, and a substantially centrally disposed, with reference to the hinge means, pivot pin extending through axially aligned sleeves each affixed to an inner end portion of a different hinge plate and through registering orifices in the inverted generally U-shaped yoke member;
 e. links pivotally connected to and linking outer end portions of the hinge means hinge plates with outer end portions of a crossbar affixed in a slot in a lower portion of the handle;
 f. the crossbar affixed in the slot in the lower portion of the handle;
 g. the weight of instrument parts including the sensing head jaws and the moveable yoke means maintaining the tong-like jaws in an open position when shoes hereinafter specified are not forcefully applied against the conductor;
 h. means limiting the extent of opening of the jaws but allowing them to open sufficiently wide to enable said jaws to be positioned about the conductor; and
 i. shoes of a substantially non-electrically conductive material attached to a lower portion of the inverted generally U-shaped yoke member and extending beyond the yoke member end, forceful application of the shoes against the conductor effecting movement of the yoke member in a direction to produce moments of force about the centrally disposed hinge pin thereby resulting in closing of the jaws to substantially encompass the conductor, and withdrawal of forceful application of the shoes from against the conductor resulting in movement of the yoke member in an opposite direction due to the weight of instrument parts including the sensing head jaws and moveable yoke assembly thereby resulting in opening of the jaws when the instrument is in a generally vertical orientation with the jaws below the handle;
 j. the sensing head adapted to be operatively associated with means for measuring the direct current passing through the conductor.

6. An instrument for measuring direct electrical current passing through a bar conductor which comprises:
 a. an elongate handle;
 b. a normally open tong-like sensing head capable of utilizing a magnetic field created by the current passing through the conductor bar for current measuring purposes, said sensing head having normally open, conductor receptive, hinged, generally arcuate, tong-like, automatically closeable and automatically openable jaws when the instrument is in a generally vertical orientation with the jaws below the handle, the jaws when closed substantially encompassing the conductor for the current measuring;
 c. a moveable yoke assembly including an inverted generally U-shaped yoke member moveable on the handle and supporting the normally open tong-like jaws;
 d. hinge means hingedly mounting the jaws on the inverted generally U-shaped yoke member, said hinge means including two hinge plates secured to upper portions of the jaws and a substantially centrally disposed, with reference to the hinge means, pivot pin extending through the passageway of two axially aligned sleeves each affixed to an inner end portion of a different hinge plate and through registering orifices in the inverted generally U-shaped yoke member;
 e. links pivotally interconnecting and linking outer end portions of the hinge means hinge plates with outer end portions of a crossbar affixed in a slot in the lower portion of the handle;
 f. the crossbar affixed in the slot in the lower portion of the handle;
 g. the weight of instrument parts including the sensing head jaws and moveable yoke assembly maintaining the jaws in an open position when the shoes hereinafter specified are not forcefully applied against the conductor;
 h. means limiting the extent of opening of the jaws but allowing them to open sufficiently wide to enable said jaws to be positioned about the conductor; and i. shoes of a substantially non-electrically conductive material attached to a lower portion of and extending beyond the end of the inverted generally U-shaped yoke member, forceful application of the shoes against the conductor effecting movement of the moveable yoke assembly in a direction to produce moments of force about the centrally disposed pivot pin thereby resulting in closing of the jaws to substantially encompass the conductor, and withdrawal of the forceful application of the shoes from against the conductor resulting in movement of the moveably yoke assembly in an opposite direction due to the weight of instrument parts including the sensing head jaws and moveable yoke assembly thereby resulting in opening of the jaws when the instrument is in a vertical orientation with the jaws below the handle;

j. the sensing head adapted to be operatively associated with means for measuring the direct electrical current passing through the conductor.

7. An instrument for measuring direct electrical current passing through a bar conductor which comprises:

a. an elongate handle;

b. a normally open, tong-like sensing head capable of utilizing a magnetic field created by the current passing through the conductor bar for current measuring purposes, said sensing head having normally open, conductor receptive, hinged, generally arcuate, tong-like, automatically closeable and automatically openable jaws when the instrument is in a generally vertical orientation with the jaws below the handle which, when closed, substantially encompass the bar conductor for the current measuring;

c. a moveable yoke assembly including a yoke sleeve moveable on the handle lower portion, a narrow width slot in a lower portion of said yoke sleeve, the slot being of larger width than that of the thickness of a crossbar affixed in a slot in the lower portion of a lower section of the handle, and an inverted generally U-shaped yoke member secured to an upper portion of the yoke sleeve, said yoke member being moveable on the handle together with said yoke sleeve;

d. the crossbar affixed in the slot in the handle lower portion and disposed in the yoke sleeve slot;

e. hinge means hingedly mounting the jaws on the inverted generally U-shaped yoke member, the hinge means including hinge plates secured to upper portions of the jaws and a substantially centrally disposed, with reference to the hinge means, pivot pin extending through the passageways of axially aligned sleeves each affixed to an inner end portion of a different hinge plate and through registering orifices in the inverted generally U-shaped yoke member;

f. links pivotally interconnecting and linking outer end portions of the hinge means hinge plates with outer end portions of the crossbar of (d);

g. the weight of instrument parts including the sensing head jaws and moveably yoke assembly maintaining the jaws in an open position when the shoes hereafter specified are not forcefully applied against the conductor;

h. means limiting the extent of opening of the jaws but allowing them to open sufficiently to enable said jaws to be positioned about the conductor; and i. shoes of a substantially non-electrically conductive material attached to a lower portion of and extending beyond the end of the inverted generally U-shaped yoke member, forceful application of the shoes against the conductor bar due to the weight of instrument parts including the sensing head jaws and moveable yoke assembly effecting movement of the moveable yoke assembly in a direction to produce moments of force about the centrally disposed pivot pin thereby resulting in closing of the jaws to substantially encompass the conductor bar and withdrawal of the forceful application of the shoes from against the conductor bar resulting in movement of the moveable yoke assembly in an opposite direction due to the weight of instrument parts including the sensing head jaws and the moveable yoke assembly thereby resulting in opening of the jaws when the instrument is in a generally vertical orientation with the jaws below the handle;

j. the sensing head adapted to be operatively associated with means for measuring the direct electrical current passing through the bar conductor.

8. The instrument of claim 7 wherein the sensing head normally open, conductor receptive tong-like jaws each comprise a non-magnetic core, and at least one electrically conductive wire coil on each core, the coils each having a multiplicity of windings and being electrically connected in series and adapted to be operatively electrically connected to the direct current measuring means.

9. The instrument of claim 8 wherein the wire of each coil is coated with a thin layer of an electrically insulating material.

10. The instrument of claim 9 wherein each tong-like jaw has an electrically insulating, corrosion resistant, mechanical attack-and abrasion-protecting non-magnetic layer of a material possessing such properties in said layer over the coil windings of each jaw.

11. The instrument of claim 10 wherein the bar conductor is a cathode bar in an electrolytic copper refinery tankhouse, and the tong-like jaws are so dimensioned as to readily pass between the cathode bar and immediately adjacent cathode bars to enable closing of the jaws about the first-mentioned cathode bar with the plane of said jaws being substantially normal to a major axis of the first-mentioned cathode bar.

12. The instrument of claim 11 wherein the material of the electrically insulating, corrosion resistant, mechanical attack- and abrasion-protecting, non-magnetic layer is a synthetic resin having such properties in said layer.

13. The instrument of claim 12 wherein the synthetic resin is an epoxy resin.

14. The instrument of claim 10 further characterized by having means effecting the automatic opening of the sensing head jaws and maintaining of said jaws in an open position when the shoes are not forcefully applied against the conductor when the instrument is in a generally vertical orientation with the jaws above the supporting means or in a generally horizontal orientation with the jaws lateral of the supporting means, as well as in a generally vertical orientation with the jaws below the supporting means.

15. The instrument of claim 14 wherein the automatic jaws opening effecting and jaws open position maintaining means is a helical spring disposed about a lower portion of the handle between and bearing against a shiftable collar locked on the handle lower portion and against the moveable yoke sleeve, the collar being locked at a desired position on the handle lower portion to provide a desired degree of compression in the helical spring and a consequent desired degree of biasing of the moveable yoke sleeve sufficient to effect the automatic opening of the jaws and the maintaining of the jaws in the open position when the shoes are not forcefully applied against the conductor.

16. The instrument of claim 11 wherein generally horizontal and substantially parallel crossbars are attached to a lower portion of the legs of the inverted generally U-shaped yoke member, the crossbars each extending an appreciable distance laterally beyond the side edges of each leg, a lowermost edge of each crossbar when the instrument is in a generally vertical orientation with the jaws below the handle being above a lower edge of each shoe.

17. The instrument of claim 10 wherein the means limiting the opening extent of the jaws is a shiftable collar locked in a desired location on the yoke sleeve, and a cushion washer of resilient material is disposed between the shiftable collar locked on the yoke sleeve and the crossbar affixed in the slot in the handle lower portion and disposed in the yoke sleeve slot.

18. The instrument of claim 11 wherein the sensing head coils are operatively electrically connected to the direct current measuring means, said current measuring means comprising an ammeter-containing meter unit also containing circuit means.

19. The instrument of claim 18 wherein the ammeter-containing meter unit is mounted on the instrument handle.

20. The instrument of claim 19 wherein the ammeter-containing meter unit is mounted on a top portion of the instrument handle.

21. The instrument of claim 20 wherein the meter unit has a short length of tube of larger diameter than that of a top portion of the instrument handle secured to a back side plate of a casing of the meter unit, the meter unit being removably mounted on a top portion of the instrument handle by means of said tube being disposed over the top portion of the handle.

22. The instrument of claim 7 wherein attrition-preventing plates are secured to confronting end faces of the tong-like jaws.

23. An instrument for measuring direct current passing through a bar conductor which comprises:
   a. an elongate supporting tube including an upper tubular section, a lower tubular section, and flexible joint means uniting the lower portion of the upper section with the upper portion of the lower section;
   b. a normally open, tong-like sensing head capable of utilizing a magnetic field created by the current passing through the conductor bar for current measuring purposes, said sensing head having normally open, hinged, tong-like automatically closeable and automatically openable jaws when the instrument is in a generally vertical orientation with the jaws below the handle which, when closed, substantially encompass the conductor for the current measuring;
   c. a moveable yoke assembly including a yoke sleeve moveable on the supporting tube lower section, a narrow width slot in a lower portion of said sleeve, the slot being of larger width than the thickness of a crossbar affixed in a slot in the lower portion of the supporting tube lower section and disposed in the yoke sleeve slot, and an inverted generally U-shaped yoke member secured to an upper portion of the yoke sleeve, said yoke member being moveable on the supporting tube lower section with the yoke sleeve;
   d. the crossbar affixed in the slot in the supporting tube lower tubular section and disposed in the yoke sleeve slot, said crossbar having an aperture in each opposite end portion;
   e. hinge means including a substantially centrally disposed, with reference to the hinge means, pivot pin extending through passageways of two axially aligned sleeves each affixed to an inner end portion of a different hinge plate and through registering orifices in the inverted generally U-shaped yoke member, and the hinge plates secured to upper portions of the tong-like jaws, each hinge plate having two spaced apart, axially aligned annular members secured to a generally downwardly extending outer end portion of said hinge plate;
   f. fastening members securing the hinge plates to the upper portions of the tong-like jaws;
   g. a shiftable collar slideable on the yoke sleeve, and means locking the collar at a predetermined location on the sleeve, said collar limiting the extent of opening of the tong-like jaws by abutting against the crossbar after a predetermined distance of downward movement of the yoke sleeve and the inverted generally U-shaped yoke member secured thereto;
   h. link arms each having a longitudinally slotted end portion with transverse axially aligned apertures through the slotted end portion and an aperture in the opposite end portion thereof, each link arm pivotally connected to the crossbar by receiving an apertured end portion of the crossbar in its slotted end portion in such manner that the crossbar apertures and link arm slotted end portion apertures register, and pivot pins through the registering apertures of the crossbars and of the slotted and apertured linkage arm end portions, and each link arm also pivotally connected at its opposite apertured end portion to each hinge plate outer end portion by a pivot pin through registering apertures of the hinge plate axially aligned annular members and of said opposite apertured end portion of the link arm, said opposite apertured end portion of the link arm being positioned between the spaced axially aligned annular members of the hinge plate outer end portion;
   i. the weight of instrument parts including the sensing head jaws and moveable yoke assembly maintaining the jaws in an open position when the shoes hereafter specified are not forcefully applied against the conductor; and
   j. shoes of substantially non-electrically conductive material attached to a lower end portion of the inverted generally U-shaped yoke member legs and extending beyond the lower ends of said yoke member legs, the shoes contacting the bar conductor upon downward lowering movement of the instrument whereby due to the weight of instrument parts including the sensing head jaws and moveable yoke assembly, the shoes, inverted generally U-shaped yoke member and yoke sleeve move upwardly to produce moments of force about the centrally disposed pivot pin thereby resulting in movement of the jaws to a closed position substantially encompassing the bar conductor and withdrawal of forceful application of the shoes from the bar conductor by an upward lifting movement of the instrument resulting in movement downwardly of the shoes, yoke sleeve and the inverted generally U-shaped yoke member due to the weight of instrument parts including the sensing head jaws and moveably yoke assembly thereby resulting in movement of the jaws to their normally open, conductor receptive position when the instrument is in a generally vertical orientation with the jaws below the supporting tube;
   k. the sensing head adapted to be electrically connected to an ammeter-containing unit also containing circuit means for measuring the current passing through the conductor.

24. An instrument for measuring electrical current passing through a conductor, which comprises:
   a. supporting means;
   b. a normally open, sensing head capable of utilizing a magnetic field created by the current through the conductor for current measuring purposes, said sensing head having normally open, pivotally mounted, automatically closeable and automatically openable jaws when the instrument is in a generally vertical orientation with the jaws below the supporting means of a non-retentive magnetic material, the jaws when closed substantially encompassing the conductor for the current measuring;
   c. means moveable on the supporting means of (a) and supporting the normally open sensing head jaws;
   d. means pivotally mounting the jaws on the last-mentioned moveable supporting means;
   e. means connecting outer end portions of the pivotal jaw mounting means with the supporting means;
   f. means maintaining the jaws in an open position when a contacting means hereinafter specified is not forcefully applied against the solid surface; and
   g. contacting means attached to the moveable yoke assembly, forceful application of the contacting means against a solid surface effecting movement of the moveable supporting means in a direction to result in the automatic closing of the jaws to substantially encompass the conductor and withdrawal of the forceful contacting means application from against the solid surface resulting in movement of the moveable supporting means in a different direction when the instrument is in a generally vertical orientation with the jaws below the supporting means to effect the automatic opening of the jaws;
   h. the sensing head adapted to be operatively associated with means for measuring the electrical current passing through the conductor.

25. The instrument of claim 24 wherein the sensing head is operatively associated with the current measuring means and said current measuring means comprises a permanent magnet needle rotatably mounted on a pivot disposed in a cavity formed in at least one of the non-retentive magnetic jaws, said magnet needle being restrained in a position substantially normal to induced flux lines in the jaw, interaction between the induced flux of the jaw and the permanent magnet needle flux causing the magnet needle to turn on its pivot an extent proportional to the amount of electrical current through the bar conductor.

26. An instrument for measuring direct electrical current passing through a bar conductor which comprises:
   a. supporting means;
   b. a normally open tong-like sensing head capable of utilizing a magnetic field created by the current through the conductor for current measuring purposes, said sensing head having normally open, hinged, tong-like, automatically closeable and automatically openable jaws when the instrument is in a generally vertical orientation with the jaws below the supporting means, of a non-retentive magnetic material, the jaws when closed substantially encompassing the conductor for the current measuring;
   c. moveable yoke means including an inverted generally U-shaped yoke member moveable on the supporting means and supporting the normally open sensing head jaws;
   d. hinge means including a substantially centrally disposed, with reference to the hinge means, pivot pin hingedly mounting the jaws on the moveable yoke means yoke member;
   e. links pivotally interconnecting and linking outer end portions of the hinge means with a lower portion of the supporting means;
   f. means maintaining the jaws in an open position when shoes hereafter specified are not forcefully applied against the solid surface;
   g. means limiting the extent of opening of the jaws but allowing them to open sufficiently wide to enable the jaws to be positioned about the conductor; and
   h. shoes of a substantially non-electrically conductive material attached to a lower portion of the yoke means yoke member and extending beyond the yoke member end, forceful application of the shoes against a solid surface effecting movement of the yoke member in a direction to produce moments of force about the centrally disposed hinge pin thereby resulting in closing of the jaws to substantially encompass the conductor bar and withdrawal of forceful application of the shoes from against the solid surface resulting in movement of the yoke member in an opposite direction due to the weight of instrument parts including the sensing head jaws and moveable yoke assembly thereby resulting in opening of the jaws when the instrument is in a generally vertical position with the jaws below the supporting means;
   i. the sensing jaws adapted to be operatively associated with magnetic flux-utilizing current measuring means for measuring the electrical current passing through the conductor.

27. The instrument of claim 26 wherein the sensing head is operatively associated with the current measuring means and said current measuring means comprises a permanent magnet needle rotatably mounted on a pivot disposed in a cavity formed in at least one of the non-retentive magnetic jaws, said magnet needle being restrained in a position substantially normal to induced flux lines in the jaw, interaction between the induced flux of the jaw and the permanent magnet needle flux causing the magnet needle to turn on its pivot an extent proportional to the amount of electrical current through the bar conductor.

28. An instrument for measuring direct electrical current passing through a bar conductor which comprises:
   a. an elongate handle;
   b. a normally open tong-like sensing head capable of utilizing a magnetic field created by the current through the conductor for current measuring purposes, said sensing head having normally open, hinged, tong-like automatically closeable and automatically openable jaws when the instrument is in a generally vertical orientation with the jaws below the supporting means, of a non-retentive magnetic material, the jaws when closed substantially encompassing the conductor for the current measuring;
   c. moveable yoke means including an inverted generally U-shaped yoke member moveable on the elongate handle and supporting the normally open sensing head jaws;
   d. hinge means hingedly mounting the jaws on the moveable yoke means yoke member, said hinge means including hinge plates secured to upper portions of the jaws, and a substantially centrally disposed, with reference to the hinge means, pivot pin extending through at least one sleeve affixed to inner end portions of the hinge plates and through registering orifices in the inverted generally U-shaped yoke member;
   e. links pivotally interconnecting and linking outer end portions of the hinge means hinge plates with outer end portions of a crossbar affixed in a slot in a lower portion of the handle;
   f. the crossbar affixed in the slot in the handle lower portion;
   g. the weight of instrument parts including the sensing head jaws and the moveable yoke means maintaining the tong-like jaws in an open position when shoes hereinafter specified are not forcefully applied against the conductor;
   h. means limiting the extent of opening of the jaws but allowing them to be opened sufficiently wide to enable the jaws to be positioned about the conductor; and
   i. shoes of a substantially non-electrically conductive material attached to a lower portion of the inverted generally U-shaped yoke member and extending beyond the yoke member end, forceful application of the shoes against the conductor due to the weight of instrument parts including the sensing head jaws and moveable yoke means effecting movement of the yoke member in a direction to produce moments of force about the pivot pin thereby resulting in closing of the jaws about the conductor and withdrawal of forceful application of the shoes from the conductor resulting in movement of the yoke member in an opposite direction due to the weight of instrument parts including the sensing head jaws and moveable yoke assembly thereby resulting in opening of the jaws when the instrument is in a generally vertical orientation with the jaws below the handle;
   j. the sensing head adapted to be operatively associated with means for measuring the direct current passing through the conductor.

29. The instrument of claim 28 wherein the sensing head is operatively associated with the current measuring means and said current measuring means comprises a permanent magnet needle rotatably mounted on a pivot disposed in a cavity formed in at least one of the non-retentive magnetic jaws, said magnet needle being restrained in a position substantially normal to induced flux lines in the jaw, interaction between the induced flux of the jaw and the permanent magnet needle flux causing the magnet needle to turn on its pivot an extent proportional to the amount of electrical current through the bar conductor.

30. An instrument for measuring electrical current passing through a conductor, which comprises:
   a. supporting means;
   b. a normally open sensing head capable of utilizing a magnetic field created by the current passing through the conductor for current measuring purposes, said sensing head having hinged, normally open, conductor receptive automatically closeable and automatically openable jaws when the instrument is in a generally vertical orientation with the jaws below the supporting means, the jaws when closed substantially encompassing the conductor for the current measuring;

c. an immovable inverted generally U-shaped first yoke including first yoke members secured at their generally horizontal upper end portions to a lower portion of the supporting means, and at their generally vertical lower end portions to outer end portions of hinge means mounting the jaws;
d. an immovable inverted generally U-shaped second yoke including second yoke members secured at their generally horizontal upper end portions to the generally horizontal upper end portions of the first yoke members or to a lower portion of the supporting means at points of securing spaced from that of the first yoke members, said second yoke members having generally vertical intermediate portions and generally vertical lower end portions below the hinge means, said second yoke members having spaced, opposite, open-ended slots in a lower portion thereof, the second yoke members open-ended slots registering with an aperture through the hinge means;
e. the hinge means mounting the sensing head jaws, said hinge means having the aperture extending therethrough;
f. a substantially centrally disposed, with reference to the hinge means, pivot pin disposed in the aperture through the hinge means, the pivot pin also extending through and moveable in the slot of said second yoke members and through spaced, opposite, orifices in lower generally vertical portions of third yoke members of a moveable third yoke;
g. a moveable inverted generally U-shaped third yoke including the third yoke members having the spaced, opposite orifices in the lower generally vertical portions thereof, said third yoke being unsecured at its generally horizontal upper end portion and the generally vertical lower portion of said third yoke being spaced laterally outwardly of the second yoke and substantially parallel to the second yoke generally vertical intermediate and lower end portions;
h. means securing said third yoke and hence said second yoke on the pivot pin;
i. means maintaining the jaws in an open position when shoes hereafter specified are not applied against the conductor; and
j. shoes attached to a lower portion of said third yoke members and extending beyond lower ends thereof, forceful application of the shoes against the conductor resulting in closing of the jaws to substantially encompass the conductor and withdrawal of forceful application of the shoes from against the conductor resulting in opening of the jaws when the instrument is in a generally vertical orientation with the jaws below the supporting means;
k. the sensing head adapted to be operatively associated with means for measuring the current passing through the conductor.

31. The instrument of claim 30 wherein the sensing head normally open, tong-like jaws each include a non-magnetic core, and at least one conductive wire coil on each core, the coils each including a multiplicity of windings and connected in series and to a current measuring means.

32. The instrument of claim 31 wherein the wire of each coil is coated with a layer of electrically insulating material.

33. The instrument of claim 32 wherein each jaw has an electrically insulating, corrosion resistant, mechanical attack and abrasion-protecting non-magnetic layer of a material possessing such properties in said layer over the coil windings of each jaw.

34. The instrument of claim 33 wherein the material of the electrically insulating, corrosion resistant, mechanical attack and abrasion-protecting, non-magnetic layer is a synthetic resin having such properties in said layer.

35. An instrument for measuring direct electrical current passing through a conductor, which comprises:

a. an elongate handle;
b. a normally open sensing head capable of utilizing a magnetic field created by the current passing through the conductor for current measuring purposes, said sensing head having hinged, normally open, automatically closeable and automatically openable, jaws when the instrument is in a generally vertical orientation with the jaws below the handle, the jaws when closed substantially encompassing the conductor for the current measuring;
c. an immovable inverted generally U-shaped first yoke including first yoke members secured at their generally horizontal upper end portions to a lower portion of the supporting means, and at their generally vertical lower end portions to outer end portions of hinge means mounting the jaws;
d. an immovable inverted generally U-shaped second yoke including second yoke members secured at their generally horizontal upper end portions to the generally horizontal upper end portions of the first yoke members or to a lower portion of the supporting means at points of securing spaced from that of the first yoke members, said second yoke members having generally vertical intermediate portions and generally vertical lower end portions below the hinge means, said second yoke members having spaced, opposite, open-ended slots in a lower portion thereof, the second yoke members open-ended slots registering with registering apertures through the hinge means hinge plates hereafter specified;
e. the hinge means mounting the sensing head jaws, said hinge means comprising the hinge plates secured to an upper portion of the jaws and having the registering apertures extending therethrough;
f. a substantially centrally disposed, with reference to the hinge means, pivot pin disposed in the apertures through the hinge plates, the pivot pin also extending through and moveable in the slot of said second yoke members and through spaced, opposite, orifices in lower generally vertical portions of third yoke members of a moveable third yoke;
g. a moveable inverted generally U-shaped third yoke including the third yoke members having the spaced opposite orifices in the lower generally vertical portions thereof, said third yoke being unsecured at its generally horizontal upper end portion and the generally vertical lower portion of said third yoke being spaced laterally outwardly of the second yoke and substantially parallel to the second yoke generally vertical intermediate and lower end portions;
h. means securing said third yoke and hence said second yoke on the pivot pin;
i. the weight of instrument parts including the sensing head jaws and the third yoke maintaining the jaws in an open position when shoes hereafter specified are not forcefully applied against the conductor;
j. shoes of a substantially non-electrically conductive material attached to a lower portion of said third yoke members and extending beyond lower ends thereof, forceful application of the shoes against the conductor resulting in upward movement of the substantially centrally disposed pivot pin in the second yoke slot aperture thereby resulting in the automatic closing of the jaws to substantially encompass the conductor and withdrawal of the forceful application of the shoes from against the conductor resulting in downward movement of the pivot pin in the second yoke slots thereby resulting in the automatic opening of the jaws when the instrument is in a generally vertical orientation with the jaws below the handle; and
k. means operatively associated with the sensing head for measuring the current passing through the conductor.

* * * * *

UNITED STATES PATENT OFFICE
CERTIFICATE OF CORRECTION

Patent No. 3,652,935                Dated March 28, 1972

Inventor(s) Frank D. Shaw

It is certified that error appears in the above-identified patent and that said Letters Patent are hereby corrected as shown below:

Column 8, line 42, "considerably" should read --considerable--. Column 12, line 43, " "-" should be deleted; line 44, Teflon," should read --"Teflon",--. Column 15, line 62, "attach" should read --attack--; line 73, --or-- should be inserted after "pertaining" and before "relating". Column 18, line 56, "hing" should read --hinge--. Column 19, line 70, "is" should read --it--. Column 20, line 16, --hand-- should be inserted after "one"; line 33, "line" should read --lines--. Column 23, line 7, "in" should read --is--; line 11, "exits" should read --exists--. Column 24, line 40, "1/4" should read --3/4--. Column 25, line 9, "150" should read --1/8--.

Signed and sealed this 21st day of November 1972.

(SEAL)
Attest:

EDWARD M. FLETCHER, JR.            ROBERT GOTTSCHALK
Attesting Officer                  Commissioner of Patents